(12) United States Patent
Roth-Mandutz et al.

(10) Patent No.: US 11,589,321 B2
(45) Date of Patent: Feb. 21, 2023

(54) EMERGENCY NOTIFICATION REQUESTING SPONTANEOUS GRANT FREE TRANSMISSION FOR V2X

(71) Applicant: Fraunhofer-Gesellschaft zur Förderung der angewandten Forschung e.V., Munich (DE)

(72) Inventors: Elke Roth-Mandutz, Nuremberg (DE); Khaled Shawky Hassan Hussein, Laatzen (DE); Thomas Heyn, Fürth (DE); Rohit Datta, Nuremberg (DE); Martin Leyh, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/901,149

(22) Filed: Jun. 15, 2020

(65) Prior Publication Data

US 2020/0314772 A1    Oct. 1, 2020

Related U.S. Application Data

(63) Continuation of application No. PCT/EP2018/085907, filed on Dec. 19, 2018.

(30) Foreign Application Priority Data

Dec. 22, 2017 (EP) .................................... 17210408
Mar. 27, 2018 (EP) .................................... 18164349

(51) Int. Cl.
*H04W 52/36*     (2009.01)
*H04W 4/70*      (2018.01)
(Continued)

(52) U.S. Cl.
CPC ....... *H04W 52/367* (2013.01); *H04L 27/2607* (2013.01); *H04W 4/40* (2018.02);
(Continued)

(58) Field of Classification Search
CPC ... H04W 52/34; H04W 52/36; H04W 52/367; H04W 52/38; H04W 52/32;
(Continued)

(56) References Cited

U.S. PATENT DOCUMENTS 9,357,402 B2    5/2016 Hassan et al.
9,888,385 B1 *  2/2018 Oh ...................... H04W 12/069
(Continued)

FOREIGN PATENT DOCUMENTS

WO    2016159712 A1    10/2016
WO    2016193840 A1    12/2016

OTHER PUBLICATIONS

3GPP TR 22.885 Technical Specification Group Services and System Aspects; Study on LTE support for Vehicle to Everything (V2X) services (Release 14), Dec. 2015.
(Continued)

*Primary Examiner* — Warner Wong
(74) *Attorney, Agent, or Firm* — McClure, Qualey & Rodack, LLP

(57) ABSTRACT

Embodiments provide a user equipment for a wireless communication system. The user equipment is configured to communicate with at least one other user equipment of the wireless communication system using a sidelink resource pool of the wireless communication system. Further, the user equipment is configured to transmit, responsive to an external emergency situation, an emergency notification signal on a resource of the wireless communication system. Thereby, the user equipment is configured to transmit the emergency notification signal with a transmit power that is greater than
(Continued)

a regular transmit power used by the user equipment for transmitting regular signals.

29 Claims, 11 Drawing Sheets

(51) Int. Cl.
| | |
|---|---|
| *H04W 4/40* | (2018.01) |
| *H04L 27/26* | (2006.01) |
| *H04W 52/32* | (2009.01) |
| *H04W 92/18* | (2009.01) |
| *H04W 4/90* | (2018.01) |
| *H04W 52/38* | (2009.01) |
| *H04W 72/12* | (2023.01) |

(52) U.S. Cl.
CPC ........... *H04W 4/70* (2018.02); *H04W 52/325* (2013.01); *H04W 4/90* (2018.02); *H04W 52/383* (2013.01); *H04W 72/12* (2013.01); *H04W 92/18* (2013.01)

(58) Field of Classification Search
CPC ... H04W 52/325; H04W 92/00; H04W 92/16; H04W 92/18; H04W 4/30; H04W 4/40; H04W 4/46; H04W 4/70; H04W 52/0261; H04W 52/04; H04W 52/28; H04W 52/322; H04W 52/383; H04W 4/90; H04W 72/00; H04W 72/12; H04W 72/1242; H04W 72/1247; H04W 74/086; H04W 76/50; H04L 27/2605; H04L 27/2607
See application file for complete search history.

(56) References Cited

U.S. PATENT DOCUMENTS

| | | | |
|---|---|---|---|
| 10,117,240 B2 | 10/2018 | Blasco Serrano et al. | |
| 10,424,035 B1* | 9/2019 | Sherpa | G16H 50/20 |
| 2003/0022630 A1* | 1/2003 | Gandhi | H04W 52/367 455/69 |
| 2008/0144582 A1* | 6/2008 | Das | H04L 1/0002 370/335 |
| 2010/0255808 A1* | 10/2010 | Guo | H04W 76/50 455/404.1 |
| 2012/0163561 A1* | 6/2012 | Zuo | H04W 4/90 379/46 |
| 2012/0289183 A1* | 11/2012 | Tiwari | H04W 76/50 455/404.1 |
| 2014/0140247 A1* | 5/2014 | Venkata | H04W 4/90 370/259 |
| 2015/0358794 A1* | 12/2015 | Nokhoudian | H04W 4/90 455/404.1 |
| 2016/0295624 A1 | 10/2016 | Novlan et al. | |
| 2016/0360527 A1* | 12/2016 | Kandhalu Raghu | H04L 43/16 |
| 2017/0018182 A1* | 1/2017 | Makled | G08G 1/096716 |
| 2017/0094523 A1* | 3/2017 | Mazzarella | H04L 63/0442 |
| 2017/0188391 A1 | 6/2017 | Rajagopal et al. | |
| 2017/0367087 A1* | 12/2017 | Seo | H04W 72/02 |
| 2018/0098291 A1* | 4/2018 | Fodor | H04W 52/346 |
| 2018/0302778 A1* | 10/2018 | Wang | H04W 28/26 |
| 2019/0159140 A1* | 5/2019 | Wang | H04W 28/065 |
| 2020/0053730 A1* | 2/2020 | Hosseini | H04L 5/0094 |
| 2020/0314771 A1* | 10/2020 | Frank | H04W 52/367 |
| 2021/0120564 A1* | 4/2021 | Lee | H04W 4/44 |
| 2021/0160890 A1* | 5/2021 | Selvanesan | H04W 24/08 |
| 2021/0211999 A1* | 7/2021 | Zhang | H04W 52/18 |

OTHER PUBLICATIONS

3GPP TR 22.886 Technical Specification Group Services and System Aspects; Study on enhancement of 3GPP Support for 5G V2X Services (Release 15), Mar. 2017.
P. Agyapong, H. Haas, A. Tyrrell and G. Auer, "Interference Tolerance Signaling Using TDD Busy Tone Concept," 2007 IEEE 65th Vehicular Technology Conference—VTC2007—Spring, Dublin, 2007, pp. 2850-2854.
3GPP TS 36.211 Evolved Universal Terrestrial Radio Access (E-UTRA); Physical Channels and Modulation, v 14.3 0. (Aug. 2017).
3GPP TS 36.212 Evolved Universal Terrestrial Radio Access (E-UTRA); Multiplexing and channel coding, v 14.3.0. (Jun. 2017).
3GPP TS 36.213 Evolved Universal Terrestrial Radio Access (E-UTRA); Physical layer procedures, v 14.3.0. (2017-06).
RP-170295 SI: Further Enhancements LTE Device to Device, UE to Network Relays for IoT and Wearables. (Mar. 2017).
3GPP TS 36.331 Evolved Universal Terrestrial Radio Access (E-UTRA); Radio Resource Control (RRC); Protocol specification, v 14.3.0. (Jun. 2017).
Fa-Long Luo (Editor), Charlie (Jianzhong) Zhang (Editor): Signal Processing for 5G: Algorithms and Implementations, ISBN: 978-1-119-11646-2, Oct. 2016, Wiley—IEEE Press, rel. pp. 60-61.
Abbas El Gamal, Young-Han Kim: Lecture Notes on Network Information Theory. arXiv:1001.3404v4 [cs,IT] Jun. 22, 2010.
3GPP TR 36.881 Study on latency reduction techniques for LIE, Technical report (TR), Rel 15, v 14.0.0. (Jun. 2016).
RP-170847 Work Item on New Radio Access (RA) Technology, Rel 15. (Mar. 2017).
SungHoon Junga, Junsu Kimb, "A new way of extending network coverage: Relay-assisted D2D communications in 3GPP"; 2016.
3GPP TS 36.321 Evolved Universal Terrestrial Radio Access (E-UTRA); Medium Access Control (MAC) protocol specification, v 14.5.0. and 14.3.0.
RP-161894 LTE-based V2X Services, LTE-based V2X Services. (Sep. 2016).
3GPP TS 36.101 Technical Specification Group Radio Access Network; Evolved Universal Terrestrial Radio Access (E-UTRA); User Equipment (UE) radio transmission and reception, V14.4.0 (Jun. 2017).
ZTE, "Considerations for latency reduction", vol. RAN WG2, No. Reno, USA; Nov. 27, 2017-Dec. 1, 2017, (Nov. 17, 2017), 3GPP Draft; R2-1713079, 3rd Generation Partnership Project (3GPP), Mobile Competence Centre ; 650, Route Des Lucioles ; F-06921 Sophia-Antipolis Cedex; France, URL:http://www.3gpp.org/ftp/tsg%5Fran/WG2%5FRL2/TSGR2%5F100/Docs/, (Nov. 17, 2017), XP051371907 [A] 1-31 * Section 2 *.
Search Report, dated Dec. 19, 2018 from PCT/EP2018/085907.
Written Opinion, datd Dec. 19, 2018 from PCT/EP2018/085907.
English Translation of Official Letter and Search Report, dated Dec. 19, 2018.
European Office Action dated Dec. 20, 2021, issued in application No. EP 18 819 161.3.
Ericsson: "Congestion Control in V2V;" 3GPP Draft; R2-165516—Congestion Control for V2V, 3rd Generation Partnership Project (3GPP); Aug. 2016.

* cited by examiner

302

Transmitting, responsive to an external time critical requirement, a notification signal on a resource of the wireless communication system

Wherein the resource of the wireless communication system is one of the following resources:
- either a guard resource of the wireless communication system, wherein the guard resource is a guard band between different resource pools of the wireless communication system, or wherein the guard resource is a guard time of a resource pool of the wireless communication system;
- or one or more reference symbols of the wireless communication system;
- or one or more resources of a defined resource pool of the wireless communication system used for exceptional data transmission (e.g. exceptional or critical or emergency pool)

and/ or

Wherein the notification signal is transmitted on the resource of the wireless communication system with one of the following transmit power options:
- the transmit power is greater than a regular transmit power used by the transceiver for transmitting signals;
- the transmit power is equal to the maximum regular allowed transmit power; or
- the transmit power is higher than a regular transmit power, wherein the notification signal is transmitted using one of the following, but not limited, options: (1) a defined power offset is added to the maximum regular transmit power; or (2) a configurable power offset increases the maximum regular transmit power.

- Detecting a signal, that is
  - transmitted with a transmit power that is equal to or higher than the maximum allowed transmit power or higher than a regular transmit power used on the resources of the wireless communication system, as notification signal;
  - or transmitted on a guard resource of the wireless communication system as notification signal, wherein the guard resource is a guard band between different resource pools of the wireless communication system, or a guard time of a resource pool of the wireless communication system
  - or transmitted on one or more reference symbols of the wireless communication system as notification signal;
  - or transmitted one or more resources of a defined resource pool of the wireless communication not used for regular data transmission system as notification signal;

~312

Switching into a time critical operation mode responsive to the detection of the notification signal.

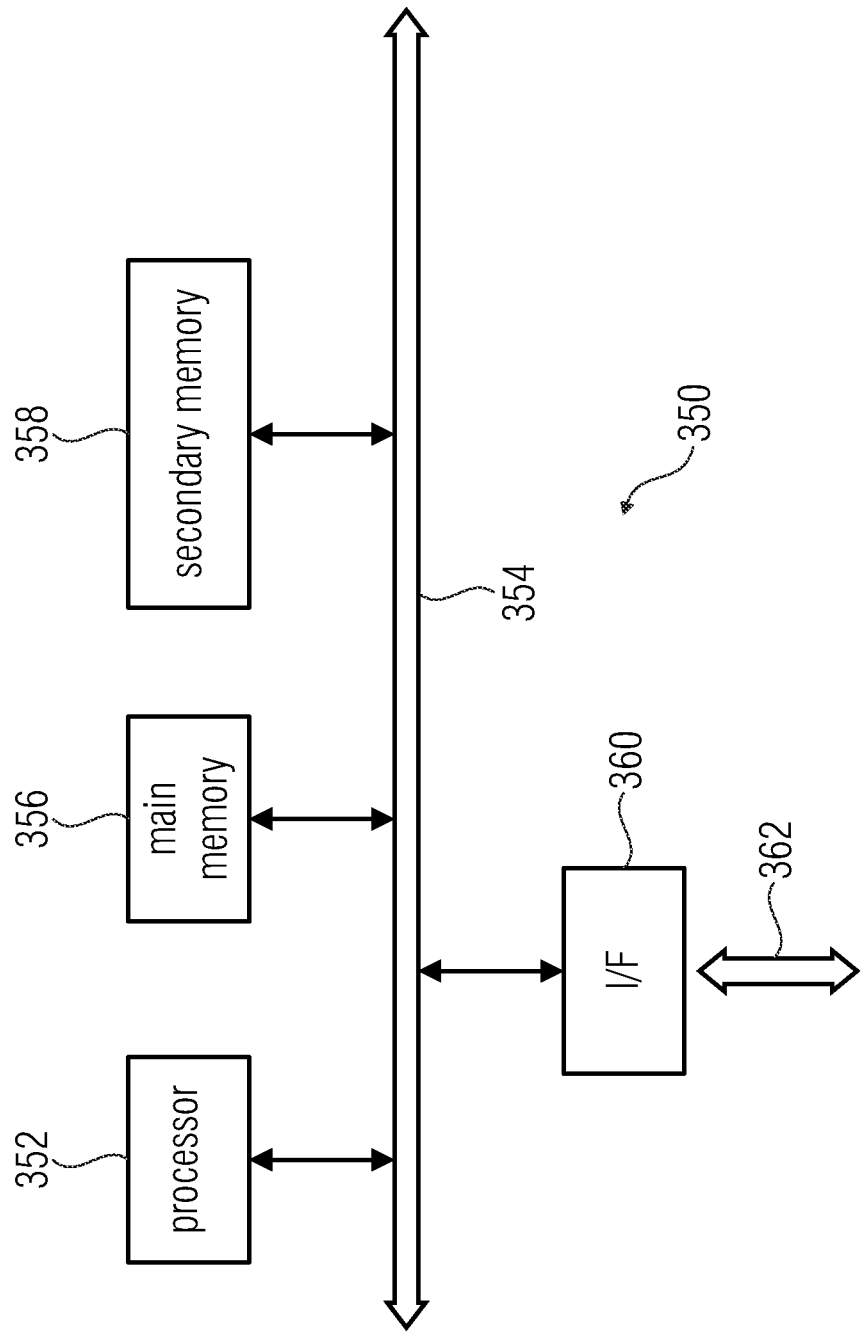

EMERGENCY NOTIFICATION REQUESTING SPONTANEOUS GRANT FREE TRANSMISSION FOR V2X

CROSS-REFERENCES TO RELATED APPLICATIONS

This application is a continuation of copending International Application No. PCT/EP2018/085907, filed Dec. 19, 2018, which is incorporated herein by reference in its entirety, and additionally claims priority from European Applications EP 17 210 408.5, filed Dec. 22, 2017, and EP 18164349.5, filed Mar. 27, 2018, all of which are incorporated herein by reference in their entirety.

BACKGROUND OF THE INVENTION

The present invention relates to the field of wireless communication networks, and more specifically, to concepts for transmitting data for ultra-reliable low latency communications (URLLC). Embodiments relate to transmitting and re-transmitting an emergency notification in V2X or D2D user equipments or UEs. Some embodiments relate to URLLC resp. emergency notification requesting spontaneous grant free transmission for V2X or D2D.

FIG. 1 is a schematic representation of an example of a wireless network 100 including a core network 102 and a radio access network 104. The radio access network 104 may include a plurality of base stations $gNB_1$ to $gNB_5$, each serving a specific area surrounding the base station schematically represented by respective cells $106_1$ to $106_5$. The base stations are provided to serve users within a cell. The term base station (BS) refers to as gNB in 5G networks, eNB in UMTS/LTE/LTE-A/LTE-A Pro, or just BS in other mobile communication standards. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Users, such as mobile devices (e.g., vehicles comprising UEs), may further communicate directly with each other in both, coverage mode and out-of-coverage mode using the PC5 interface, as will be discussed later on with respect to FIGS. 3 and 4. Further, FIG. 1 shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1 by the arrows pointing to "gNBs".

The wireless network or communication system depicted in FIG. 1 may be a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame or radioframe having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length. A frame may also consists of a smaller number of OFDM symbols, e.g. if utilizing shortened transmission time intervals (sTTI) or a mini-slot/non-slot-based frame structure comprising of just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$, to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow $124_1$ and by the small cell base station $SeNB_1$, as indicated schematically by the arrow $124_2$.

In mobile communication networks, for example in networks like those described above with reference to FIG. 1 and FIG. 2, like a LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, pedestrians or network infrastructure (V2I). Other UEs may not be vehicular related UEs but may comprise any of the above mentioned devices. Such devices may also communicate directly with each other using the sidelink channels (i.e., direct communication, such as D2D or V2X communication, where V2X could be seen as special form of D2D, e.g., D2D with mobility).

When considering two UEs directly communicating with each other over the sidelink, both UEs may be served by the same base station, i.e., both UEs may be within the coverage area of a base station, like one of the base stations depicted in FIG. 1. This is referred to as a "in coverage" scenario. In accordance with other examples, both UEs that communicate over the sidelink may not be served by a base station which is referred to as an "out-of-coverage" scenario. It is noted that "out-of-coverage" does not mean that the two UEs are not within one of the cells depicted in FIG. 1 or in FIG. 2, rather, it means that these UEs are not connected to a base station, for example, they are not in a RRC connected state. Yet another scenario is called a "partial coverage" scenario, in accordance with which one of the two UEs which communicate with each other over the sidelink, is served by a base station, while the other UE is not served by the base station. In each of the above-mentioned scenarios, the UEs and/or the BS should have knowledge about the resources to be used for the sidelink communication among the UEs.

FIG. 3 shows a schematic representation of a situation in which two UEs directly communicating with each other are both in coverage of a base station. The base station gNB has a coverage area that is schematically represented by the circle 200 which, basically, corresponds to the cell schematically represented in FIG. 1 or FIG. 2. The UEs directly communicating with each other include a first vehicle 202 and a second vehicle 204 both in the coverage area 200 of the base station gNB (this also works for any scenario where the 2 UEs are connected to different gNBs). Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. The BS schedules and assigns the resources to be used within a given resource pool for the V2V communication over the sidelink. The UE operates in this mode only when in coverage and in an RRC_CONNECTED state. This configuration is also referred to as a mode 3 configuration (for D2D this is referred to as mode 1).

FIG. 4 shows a scenario in which the UEs are out of coverage of a BS, i.e., the respective UEs directly communicating with each other may or may not be connected to a base station (i.e. they also may be physically within the coverage of a cell of a wireless communication network and could even be in either RRC_CONNECTED or RRC_IDLE state). Three vehicles 206, 208 and 210 are shown directly communicating with each other over a sidelink, e.g., using the PC5 interface. The scheduling and/or interference management of the V2V traffic is based on algorithms implemented in the UEs and/or (partially) pre-configured by the network. This configuration is also referred to as a mode 4 configuration.

As mentioned above, the scenario in FIG. 4 which is an out-of-coverage scenario does not mean that the respective mode 4 UEs have to be outside of the coverage of a base station, rather, it means that the respective mode 4 UEs are not served by a base station or are not connected to the base station of the coverage area. Thus, there may be situations in which, within the coverage area 200 shown in FIG. 3, in addition to the mode 3 UEs 202, 204 also mode 4 UEs 206, 208, 210 are present. Since the mode 4 UEs 206-210 schedule their resources autonomously and are not connected to the network, the base station is not aware of resources used by the mode 4 UEs 206-210 for the sidelink communication and, likewise, the mode 4 UEs 206-210 are not aware of resources scheduled by the base station gNB to the mode 3 UEs 202, 204 for a sidelink communication. Thus, resource collisions among the UEs in the respective modes and among mode 4 UEs may occur.

In wireless communication networks as described above with reference to FIG. 1 to FIG. 4, going towards fully autonomous driving, 3GPP defined V2X use cases to support "Advanced Driving" and "Platooning Driving", including use cases such as Cooperative Collision Avoidance (CoCA) and "Fully automated driving". Collision avoidance requires low latency combined with strict reliability to ensure almost real-time reaction. The CoCA requirements for connected vehicles are defined in TR 22.886 [2]:

Message size up to 2 kByte depending on the number of involved vehicles, to exchange pre-planned trajectories between vehicles. In NR (new radio) [13] the message size starts from 32 bytes for URLLC.

Less than 10 ms latency for regular maneuver coordination within the CoCA application time limit. In addition ([12], [13]), latency may be reduced to 1 ms.

99.99% reliability for safety coordinated driving maneuver.

Even more stringent requirements are given in [2] for "Fully automated driving" requesting a latency of 3 ms with 99.9999% reliability.

FIG. 5 presents an example for a possible V2X communication to avoid collisions. This example shows people unexpectedly appearing in front of a moving car/cars/platooning-car-set, yet multiple further cars are following closely behind. Immediate braking or collision avoiding measures of the first and all consecutive vehicles is needed to avoid accidents. Direct V2V communication is needed, e.g. if obstacles are not in line-of-sight and thus, cannot be noticed by the vehicle mounted sensors.

V2X is initiated by the first vehicle detecting an obstacle in the driving direction, e.g. by vehicular mounted sensors. The generated alarm invokes an emergency notification (EN), e.g. a sidelink emergency tone (SET) using V2V (or V2X) on the sidelink, broadcasted by the detecting vehicle to all vehicles in proximity.

The EN/SET has to be transmitted with minimum delay demanding an ultra-reliable and low latency communication (URLLC).

Currently scheduled and shared access for D2D is defined in the 3GPP LTE standard; yet, a resource pool is being granted for D2DN2V transmission. Transmission mode 1 and transmission mode 3 are performed by grant-based resources taken care by the base station (BS). However, transmission mode 2 and transmission mode 4 are shared where the UEs access a shared resource pool and transmit on its resource blocks (RBs) using a pre-sensing mechanism, random transmission, or more complex approaches, e.g., game theoretic and/or approaches optimization.

To reduce the latency further, physical layer and/or upper layers optimization need to be considered. In the physical layer a reduced transmission time interval (TTI), namely short-TTI (sTTI) [12], may apply.

Furthermore, in New Radio (NR) a new subcarrier spacing numerology that reduces the TTI to less than ⅛ of its original length, is proposed. Currently, in the 3GPP release 15 for V2X, a sTTI transmission was deferred to future releases. However, a main issue remains, which is the latency caused by scheduling and access granting, which our idea tries to resolve.

In the 3GPP standard, an alarm messages can be broadcasted in the physical broadcast channel (PBCH) or as a system information (SI) block in the SIB messages or as a master information blocks in the MIB. This message is a decodable message which is broadcasted by the BS to neighboring UEs scanning the BS PBCH information. This message is network-controlled, decodable and has a limited number of fields. This message cannot be easily used for V2V/V2P/V2I low latency communication, demanding direct communication in proximity and it has a limited number of fields that will not be sufficient to cover all possible alarm scenarios, use-cases and massive number of simultaneous V2V/V2P/V2I/V2X links.

In 3GPP, priority handling is maintained by the BS for prioritized transmission. With release 13, priority handling is introduced for proximity services (ProSe), which also applies to transmission pool selection in the case of UE-autonomous resource selection. The network can configure one or multiple PPPP (ProSe per packet priority) for each transmission pool in the list of pools. Then, the UE selects a transmission pool associated with the PPPP based on service information by the network [15]. This kind of priority handling does not cover emergency handling in V2X based on vehicular mounted sensor requesting immediate reaction.

For V2X transmission, the BS allocates a resource pool in the UL transmission band (together with the random-access transmission grants) which can be used for side-link transmission, i.e., V2V. Similarly, the vehicles can exchange information with pedestrians using sidelink communication, e.g. using V2P.

Since the sidelink uses/coexists with the uplink resources, all waveforms including OFDM-based and single-carrier transmission (e.g. SC-FDMA, reference signal) shall be supported.

Further, busy tone concepts are described in [3]; V2X, V2V, D2D, and sidelinks are described in [4, 5, 6]; relaying and D2D relaying are described in [7]; sideband transmission is described in [8]; grant-free transmission in the sidelinks (transmission mode 2 and 4 D2D) is described in [9, 15, 16]; power-based or codebook based orthogonal and non-orthogonal multiple access are described in [10]; asynchronous access and multi-user access are described in [11]; LTE-based shorten transmit-time interval (sTTI) and new-radio reduced transmission time reduction and wider sub-carrier spacing, referring to ultra-reliable and low-latency communication (URLLC) are described in [12, 13]; and power ramping during the initial access procedure (RACH-procedure) is described in [6].

SUMMARY

An embodiment may have a transceiver for a wireless communication system, wherein the transceiver is configured to communicate with at least one other transceiver of the wireless communication system using a resource pool of the wireless communication system; wherein the transceiver is configured to transmit, responsive to an external time critical requirement, a notification signal on a resource of the wireless communication system; wherein the resource of the wireless communication system is one of the following resources: a guard resource of the wireless communication system, wherein the guard resource is a guard band between different resource pools of the wireless communication system; or one or more reference symbols of the wireless communication system; and/or wherein the transceiver is configured to transmit the notification signal on the resource of the wireless communication system with one of the following transmit power options: the transmit power is higher than the maximum allowed transmit power, wherein the transceiver is configured to transmit the notification signal using one of the following options: a defined power offset is added to the maximum allowed transmit power; or a configurable power offset increases the maximum allowed transmit power.

Another embodiment may have a transceiver for a wireless communication system, wherein the transceiver is configured to communicate with at least one other transceiver of the wireless communication system using a resource pool of the wireless communication system; wherein the transceiver is configured to detect a signal, that is transmitted with a transmit power that is higher than the maximum allowed transmit power, as notification signal; or transmitted on a guard resource of the wireless communication system as notification signal, wherein the guard resource is a guard band between different resource pools of the wireless communication system; or transmitted on one or more reference symbols of the wireless communication system as notification signal; wherein the transceiver is configured to switch into a time critical operation mode responsive to the detection of the notification signal.

Another embodiment may have a wireless communication system, having one or more of the transceivers according to the invention.

Another embodiment may have a method for transmitting signals in a wireless communication system, the method having the steps of: transmitting, responsive to an external time critical requirement, a notification signal on a resource of the wireless communication system; wherein the resource of the wireless communication system is one of the following resources: either a guard resource of the wireless communication system, wherein the guard resource is a guard band between different resource pools of the wireless communication system; or one or more reference symbols of the wireless communication system; and/or wherein the notification signal is transmitted on the resource of the wireless communication system with one of the following transmit power options: the transmit power is higher than the maximum allowed transmit power, wherein the notification signal is transmitted using one of the following options: a defined power offset is added to the maximum allowed transmit power; or a configurable power offset increases the maximum allowed transmit power.

Another embodiment may have a method for receiving signals in a wireless communication system, the method having the steps of: detecting a signal, that is transmitted with a transmit power that is higher than the maximum allowed transmit power, as notification signal; or transmitted on a guard resource of the wireless communication system as notification signal, wherein the guard resource is a guard band between different resource pools of the wireless communication system; or transmitted on one or more reference symbols of the wireless communication system as notification signal; switching into a time critical operation mode responsive to the detection of the notification signal.

Another embodiment may have a non-transitory digital storage medium having a computer program stored thereon to perform the method for transmitting signals in a wireless communication system, the method having the steps of: transmitting, responsive to an external time critical requirement, a notification signal on a resource of the wireless communication system; wherein the resource of the wireless communication system is one of the following resources: either a guard resource of the wireless communication system, wherein the guard resource is a guard band between different resource pools of the wireless communication system; or one or more reference symbols of the wireless communication system; and/or wherein the notification signal is transmitted on the resource of the wireless communication system with one of the following transmit power options: the transmit power is higher than the maximum allowed transmit power, wherein the notification signal is transmitted using one of the following options: a defined power offset is added to the maximum allowed transmit power; or a configurable power offset increases the maximum allowed transmit power, when said computer program is run by a computer.

Another embodiment may have a non-transitory digital storage medium having a computer program stored thereon to perform the method for receiving signals in a wireless communication system, the method having the steps of: detecting a signal, that is transmitted with a transmit power that is higher than the maximum allowed transmit power, as notification signal; or transmitted on a guard resource of the wireless communication system as notification signal, wherein the guard resource is a guard band between different resource pools of the wireless communication system; or transmitted on one or more reference symbols of the wireless communication system as notification signal; switching into a time critical operation mode responsive to the detection of the notification signal, when said computer program is run by a computer.

Another embodiment may have a transceiver for a wireless communication system, wherein the transceiver is configured to communicate with at least one other transceiver of the wireless communication system using a sidelink resource pool of the wireless communication system; wherein the transceiver is configured to transmit, responsive to an external time critical requirement, a notification signal on a resource of the wireless communication system in an alternative frequency band not used by the wireless communication system.

Another embodiment may have a transceiver for a wireless communication system, wherein the transceiver is configured to communicate with at least one other transceiver of the wireless communication system using a sidelink resource pool of the wireless communication system; wherein the transceiver is configured to detect a signal, that is transmitted in an alternative frequency band not used by the wireless communication system as notification signal; wherein the transceiver is configured to switch into a time critical operation mode responsive to the detection of the notification signal.

Embodiments provide a transceiver (e.g., first transceiver) for a wireless communication system, wherein the transceiver is configured to communicate with at least one other transceiver of the wireless communication system using a resource pool (e.g., a sidelink resource pool) of the wireless communication system. The transceiver is configured to transmit, responsive to an external time critical requirement, a notification signal on a resource of the wireless communication system.

Thereby, the transceiver (e.g., first transceiver) can be configured to transmit the notification signal on one of the following resources:
  a guard resource of the wireless communication system, wherein the guard resource is a guard band between different resource pools of the wireless communication system, or wherein the guard resource is a guard time of a resource pool of the wireless communication system;
  one or more reference symbols of the wireless communication system (for example, V2X reference symbols); or
  one or more resources of a defined resource pool of the wireless communication used for exceptional data transmission system (e.g. exceptional or critical or emergency pool).

Additionally, or alternatively, the transceiver (e.g., first transceiver) can be configured to transmit the notification signal on the resource of the wireless communication system with one of the following transmit power options:
  the transmit power is greater than a regular transmit power used by the transceiver for transmitting signals;
  the transmit power is equal to the maximum regular allowed transmit power; or
  the transmit power is higher than a maximum regular transmit power, wherein the transceiver is configured to transmit the notification signal using one of the following, but not limited, options:
    a defined power offset is added to the maximum regular transmit power; or
    a configurable power offset increases the maximum regular transmit power.

In embodiments, the external critical requirement can be an emergency situation or a latency critical communication. For example, the latency critical communication can be an ultra-low latency communication with low data volume, e.g. industrial communication between machines. Thereby, the external critical requirement is not limited to emergency situations, but may also be applicable for overload situations, when any kind of latency critical messaging is needed.

In embodiments, the time-critical requirement (i.e., the emergency situation or the latency critical communication) can be indicated by a PPPP value (PPPP=ProSe per packet priority) or PPPR value (PPPR=ProSe per packet reliability) or a combination thereof.

In embodiments, the notification signal may indicate a special need, which is different from regular transmission.

In embodiments, the one or more reference symbols are typically not used for data transmission, but e.g. for synchronization purposes.

In embodiments, the configurable power offset can depend on operator and/or environmental settings and/or conditions.

In embodiments, the transceiver (e.g., first transceiver) can be allowed to access the resource of the wireless communication system without being granted.

In embodiments, the guard time of the resource pool (which can be on a sidelink) on which the transceiver transmits the notification signal can be a last symbol of at least one out of a subframe, for example, for the sidelink allocated subframe the last fourteenth symbol;

a slot;

a transmission time interval; and a shortened transmission time interval.

For example, the resource on which the notification signal is transmitted can be the last symbol of the TTI, which is (mostly) used in V2X as guard time.

In embodiments, the guard time of the resource pool (which can be on a sidelink) on which the transceiver transmits the notification signal can be a configurable number of last symbols of at least one out of a subframe, for example, for the sidelink allocated subframe the last fourteenth symbol;

a slot;

a transmission time interval; and a shortened transmission time interval.

For example, the configurable number of last symbols can include the last symbol.

For example, the configurable number of last symbols can include at least two OFDM symbols, such as two, three, four, five, six or seven OFDM symbols.

In embodiments, the guard band on which the transceiver transmits the notification signal can be a guard band between a cellular resource pool and a sidelink resource pool of the wireless communication system.

In embodiments, the transceiver (e.g., first transceiver) can be configured to transmit the notification signal with a certain power up to the maximum possible transmit power allowed according to a mobile communication standard according to which the transceiver is configured to operate.

In embodiments, the transceiver (e.g., first transceiver) can be configured to transmit the notification signal with a transmit power higher than the configured one by a maximum power reduction (MPR) and a maximum power reduction (A-MPR).

In embodiments, the transceiver (e.g., first transceiver) can be served by a central transceiver, for example, a base station, of the wireless communication system, wherein the transceiver is configured to operate in a first mode of operation, for example the D2D Mode 1 or V2X Mode 3, in which scheduling of resources for the communication with the at least one other transceiver is performed by the central transceiver, wherein the resource on which the transceiver is configured to transmit the notification signal can be one out of a resource of the sidelink resource pool;

a guard band between the sidelink resource pool and the cellular resource pool;

a guard time of the sidelink resource pool; or a reference symbol of the sidelink resource pool.

In embodiments, the transceiver (e.g., first transceiver) can be configured to operate in a second mode of operation, for example the D2D Mode 2 or V2X Mode 4, wherein the transceiver is configured to schedule resources for the sidelink communication autonomously, wherein the resource on which the transceiver is configured to transmit the notification signal can be one out of a resource of the sidelink resource pool;

a guard band between the sidelink resource pool and the cellular resource pool;

a guard time of the sidelink resource pool; or a reference symbol of the sidelink resource pool.

For example, the guard band can be restricted from the use of "normal" communication. For example, the guard band can be the guard band separating the cellular resource pool (e.g., 4G (LTE) or 5G resource pool) from the sidelink resource poll (e.g., V2X resource pool). For example, the UEs of LTE or V2X are able to decode this band. For example, in this guard band a signal or pattern can be transmitted as an alarm (=notification signal) to inform other UE-V2X to stop/postpone transmission. Further, few bits can also be decoded from this alarm stating few features as stated in the below description. Additionally, the guard (separating LTE-UEs and V2X-UEs) can be in time and frequency.

In embodiments, the transceiver (e.g., first transceiver) can be configured to re-transmit the notification signal at least once on another resource of the wireless communication system.

Thereby, the other resource of the wireless communication system can be one of the following resources:

a guard resource of the wireless communication system, wherein the guard resource is a guard band between different resource pools of the wireless communication system, or wherein the guard resource is a guard time of a resource pool of the wireless communication system;

one or more reference symbols of the wireless communication system; or an exceptional or critical or emergency pool;

Additionally, or alternatively, the transceiver (e.g., first transceiver) can be configured to re-transmit the notification signal with one of the following transmit power options:

the transmit power is greater than a regular transmit power used by the transceiver for transmitting signals;

the transmit power is the maximum regular allowed transmit power; or the transmit power is higher than a regular transmit power, wherein the transceiver is configured to transmit the notification signal using one of the following, but not limited, options:

a defined power offset is added to the maximum regular transmit power; or a configurable power offset increases the maximum regular transmit power.

In embodiments, the transceiver (e.g., first transceiver) can be configured to re-transmit the notification signal (only) when one of the following, but not limited to those, conditions apply:

another transceiver of the wireless communication system in proximity is out of coverage of the notification signal transmitted by the transmitter; or the transceiver receives from another transmitter of the wireless communication system in proximity data, while transmitting the notification signal, wherein in this case the transceiver is configured to transmit an ACK/NAK for the received data in combination with the notification signal during the next transmission.

In embodiments, the transceiver (e.g., first transceiver) can be configured to select the resource on which the notification signal is transmitted and the other resource on which the notification signal is re-transmitted using a random or pseudo-random hopping pattern.

In embodiments, the transceiver (e.g., first transceiver) can be configured to encode the notification signal, wherein the notification signal comprises a signature code that is selected differently by each transceiver of the wireless communication system.

Thereby, the transceiver (e.g., first transceiver) can be configured to encode the notification signal on a bit-level, wherein the transceiver can be configured to select the signature code using one of the following options:
  randomly selecting pseudo random (PN) codes of certain length generated from an orthogonal/orthonormal code set, e.g., using a limited pseudo random sequence Walsh codes; or
  randomly selecting a pseudo random (PN) codes of certain length generated from an orthogonal/quasi-orthogonal/semi-orthogonal code set using a pseudo random sequence generator like the binary Gold sequence (or Gold codes).

Alternatively, the transceiver (e.g., first transceiver) can be configured to encode the notification signal on a IQ (complex-valued) level, wherein the transceiver can be configured to select the signature code using one of the following options:
  a random or quasi random complex-valued code, like the Zadoff-Chu (ZC) sequence; or
  randomly generating cyclic shifts of an original sequence having orthogonal/quasi-orthogonal codes.

In embodiments, the notification signal can be configured to cause at least one other transceiver of the wireless communication system to mute transmissions.

In embodiments, the transceiver (e.g., first transceiver) can be configured to generate the notification signal using a random or pseudo random code.

For example, the transceiver can be configured to multiply the notification signal with a random code (pseudo random), e.g., it could be unique for the band ID and random for the user, it can be other options as well.

In embodiment, the transceiver (e.g., first transceiver) can be a user equipment. The user equipment can be configured to detect the external time critical requirement and transmit the (initial) notification signal.

For example, the transceiver (e.g., first transceiver) can be a user equipment of a first vehicle that detects the emergency situation and transmits the (initial) notification signal.

Further embodiments provide a transceiver (e.g., second transceiver) for a wireless communication system, wherein the transceiver is configured to communicate with at least one other transceiver of the wireless communication system using a resource pool (e.g., a sidelink resource pool) of the wireless communication system, wherein the transceiver is configured to detect a signal, that is
  transmitted with a transmit power that is equal to or higher than the maximum allowed transmit power or higher than a regular transmit power used on the resources of the wireless communication system, as notification signal;
  or transmitted on a guard resource of the wireless communication system as notification signal, wherein the guard resource is a guard band between different resource pools of the wireless communication system, or wherein the guard resource is a guard time of a resource pool of the wireless communication system;
  or transmitted on one or more reference symbols of the wireless communication system as notification signal;
  or transmitted one or more resources of a defined resource pool of the wireless communication not used for regular data transmission system as notification signal;
wherein the transceiver is configured to switch into a time critical operation mode responsive to the detection of the notification signal.

In embodiments, the transceiver (e.g., second transceiver) can be configured, in the emergency operation mode, to mute an ongoing transmission.

In embodiments, the transceiver (e.g., second transceiver) can be configured, in the time critical operation mode, to re-transmit the notification signal on a resource of the wireless communication system.

Thereby, the transceiver (e.g., second transceiver) can be configured to re-transmit the notification signal on one of the following resources:
  either a guard resource of the wireless communication system, wherein the guard resource is a guard band between different resource pools of the wireless communication system, or wherein the guard resource is a guard time of a resource pool of the wireless communication system;
  or one or more reference symbols of the wireless communication system.

Additionally, or alternatively, the transceiver (e.g., second transceiver) can be configured to transmit the notification signal on the resource of the wireless communication system with one of the following transmit power options:
  the transmit power is greater than a regular transmit power used by the transceiver for transmitting signals;
  the transmit power is equal to the maximum regular allowed transmit power; or
  the transmit power is higher than a regular transmit power, wherein the transceiver is configured to transmit the notification signal using one of the following, but not limited, options:
    a defined power offset is added to the maximum regular transmit power; or
    a configurable power offset increases the maximum regular transmit power.

In embodiments, the transceiver (e.g., second transceiver) can be configured to re-transmit the notification signal (only) when one of the following, but not limited to those, conditions apply:
  another transceiver of the wireless communication system in proximity is out of coverage of the detected notification signal; or
  the transceiver receives from another transmitter of the wireless communication system in proximity data, while the notification signal is transmitted, wherein in this case the transceiver is configured to transmit an ACK/NAK for the received data in combination with the notification signal during the next transmission.

In embodiments, the transceiver (e.g., second transceiver) can be configured, in the time critical operation mode, to transmit a transmission mute notification signal configured to cause another transceiver to mute transmissions in the sidelink resource pool.

In embodiments, the transceiver (e.g., second transceiver) can be a user equipment. The user equipment can detect the notification signal and switch into a time critical operation mode, in which the transceiver can mute ongoing transmissions and optionally re-transmit the notification signal.

For example, the transceiver (e.g., second transceiver) can be a user equipment of a second vehicle that detects the (emergency) notification signal and switches into the emergency operation mode responsive to the detection of the (emergency) notification signal, in which user equipment mutes ongoing transmissions and optionally re-transmits the (emergency) notification signal.

Further embodiments provide a wireless communication system comprising at least two of the above described transceivers, e.g., at least one first transceiver and one or more second transceivers.

In embodiments, the transceivers can include D2D Mode 1 user equipments, D2D Mode 2 user equipments, V2X Mode 3 user equipment's, or V2X Mode 4 user equipments.

In embodiments, the wireless communication system can optionally comprise a base station, a macro cell base station, a small cell base station or a road side unit.

For example, the base station can be any kind of 4th or 5th generation base station, e.g., a gNB, a eNB on an access point (ITS).

Further embodiments provide a method for transmitting signals in a wireless communication system, the method comprises a step of transmitting, responsive to an external time critical requirement, a notification signal on a resource of the wireless communication system;

Thereby, the notification signal can be transmitted on one of the following resources:
  either a guard resource of the wireless communication system, wherein the guard resource is a guard band between different resource pools of the wireless communication system, or wherein the guard resource is a guard time of a resource pool of the wireless communication system;
  or one or more reference symbols of the wireless communication system;
  one or more resources of a defined resource pool of the wireless communication system used for exceptional data transmission (e.g. exceptional or critical or emergency pool).

Additionally, or alternatively, the notification signal can be transmitted on the resource of the wireless communication system with one of the following transmit power options:
  the transmit power is greater than a regular transmit power used by the transceiver for transmitting signals;
  the transmit power is equal to the maximum regular allowed transmit power; or
  the transmit power is higher than a regular transmit power, wherein the notification signal is transmitted using one of the following, but not limited, options:
    a defined power offset is added to the maximum regular transmit power; or
    a configurable power offset increases the maximum regular transmit power.

Further embodiments provide a method for receiving signals in a wireless communication system, the method comprising a step of detecting a signal, that is
  transmitted with a transmit power that is equal to or higher than the maximum allowed transmit power or higher than a regular transmit power used on the resources of the wireless communication system, as notification signal;
  or transmitted on a guard resource of the wireless communication system as notification signal, wherein the guard resource is a guard band between different resource pools of the wireless communication system, or a guard time of a resource pool of the wireless communication system
  or transmitted on one or more reference symbols of the wireless communication system as notification signal;
  or transmitted one or more resources of a defined resource pool of the wireless communication not used for regular data transmission system as notification signal;
and a step of switching into a time critical operation mode responsive to the detection of the notification signal.

Further embodiments provide a transceiver (e.g., first transceiver) for a wireless communication system, wherein the transceiver is configured to communicate with at least one other transceiver of the wireless communication system using a resource pool (e.g., a sidelink resource pool) of the wireless communication system, wherein the transceiver is configured to transmit, responsive to an external time critical requirement, a notification signal on a resource of the wireless communication system in an alternative frequency band not used by the wireless communication system.

Further embodiments provide a transceiver (e.g., second transceiver) for a wireless communication system, wherein the transceiver is configured to communicate with at least one other transceiver of the wireless communication system using a sidelink resource pool of the wireless communication system, wherein the transceiver is configured to detect a signal, that is transmitted in an alternative frequency band not used by the wireless communication system as notification signal, wherein the transceiver is configured to switch into a time critical operation mode responsive to the detection of the notification signal.

Further embodiments provide a transceiver configured to transmit an emergency notification. The initial notification of an emergency can be a unique signal, i.e. it can be distinguished from all other signals.

An emergency notification (EN) is not limited to emergency use cases, e.g. immediate use of the break for V2X, but may apply for any message demanding very low latency, e.g. also in industrial automation.

An emergency notification can be a unique signal, which may be limited to one symbol, i.e. as a minimum just one bit would be transmitted.

For an EN any single or any combination of the following criteria may apply:
  Exceeds usually expected/allowed maximum power
  Specific pattern
  Specific resource location, which may be one of the following:
    FDD—Guard band between frequency bands—usually to allowed to be used for transmission
    TDD—Guard time—e.g. for V2X last symbol of the slot, which was specifically introduced for V2X to ensure synchronization during high speed
    TDD—Use of one or multiple of the reference symbols—i.e. for V2X the number of reference signal symbols (demodulation reference signal (DMRS)) was increased from 2 (normally used for LTE communication) to 4 reference symbols per slot, to allow improve frequency alignment and channel estimation. One or more of these reference symbols could be used to signal an EN. We assume this will not cause a synchronization problem during typical emergency situations, where the speed of the vehicular UEs may be low to zero.

Whenever any other UE receives the EN, it will stop transmission on follow-up resources, even if they were previously assigned. This way, the next resources are free to transmit the emergency information.

Further embodiments provide a method to transmit an emergency notification signal (flagging a need to evacuate resources in consecutive subframes) in an exceptional pool, emergency pool, critical pool, or any auxiliary pool defined to be monitored by all vehicles in the same network. This EN message has to be very small and may contain emergency notification only or more data about the emergency details.

Further embodiments provide a method for transmitting the EN in an alternative band, e.g., unlicensed bands or high frequency/short-range communication bands, as far as vehicles in the same network in the network are able to receive messages on those alternative bands. The EN message in this case may contain emergency notification and/or more data about the emergency details.

Further embodiments provide a method for receiving the EN signal from the exceptional pool and follow the designed sequence and steps to evacuate resources/suppress transmission in consecutive subframes in the defined transmission resource pool.

Further embodiments provide a method for receiving the EN signal (e.g., by tuning and/or continuous monitoring) on all alternative bands defined resources for EN signal transmission. The method can comprise evacuating resources/ suppressing transmissions in consecutive subframes in the defined transmission resource pool.

BRIEF DESCRIPTION OF THE DRAWINGS

Embodiments of the present invention will be detailed subsequently referring to the appended drawings, in which:

FIG. 10 shows a flowchart of a method for transmitting signals in a wireless communication system, according to an embodiment;

FIG. 11 shows a flowchart of a method for receiving signals in a wireless communication system, according to an embodiment;

FIG. 12 illustrates an example of a computer system on which units or modules as well as the steps of the methods described in accordance with the inventive approach may execute.

DETAILED DESCRIPTION OF THE INVENTION

Figure 1:
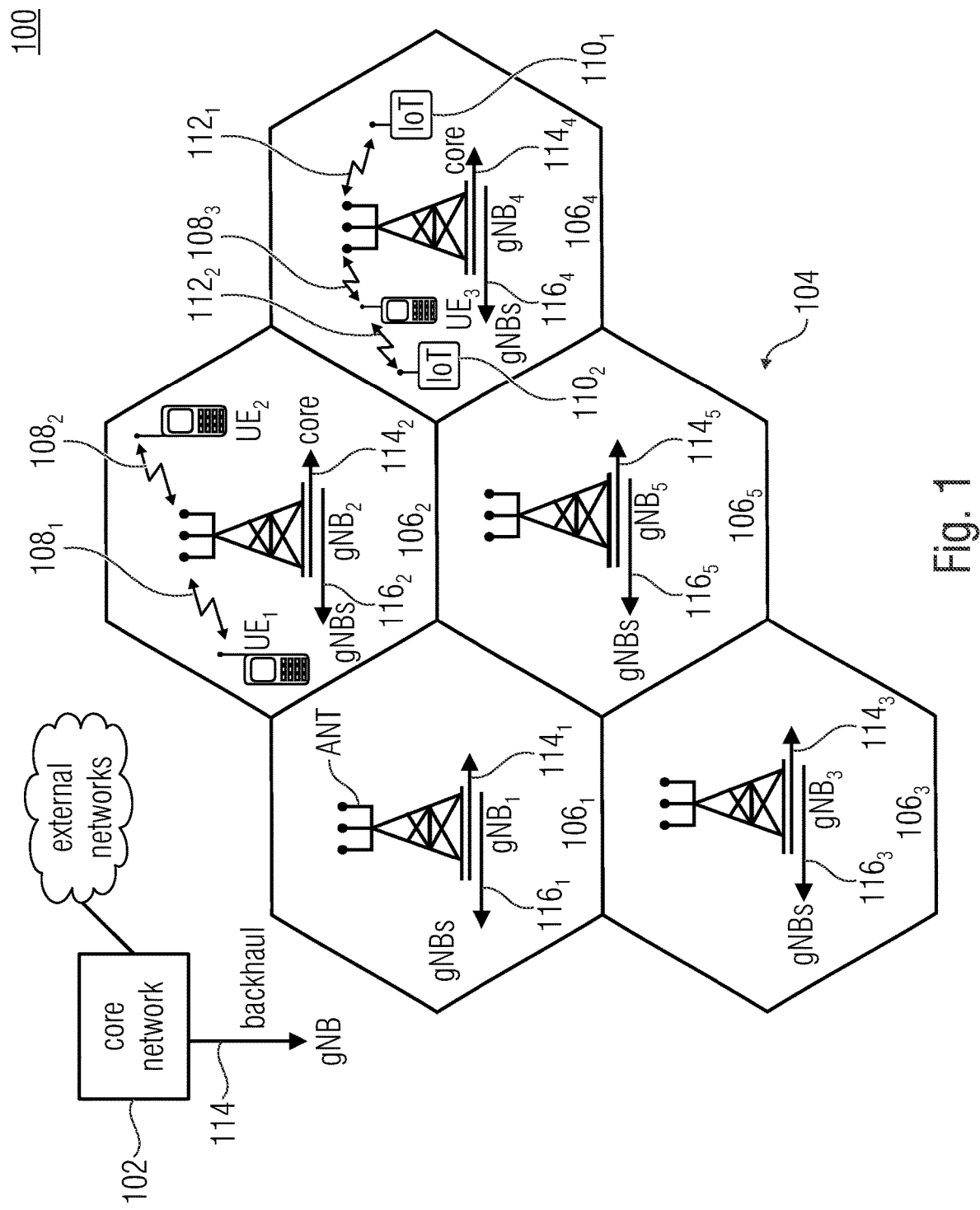
FIG. 1 shows a schematic representation of an example of a wireless communication system.
Figure 2:
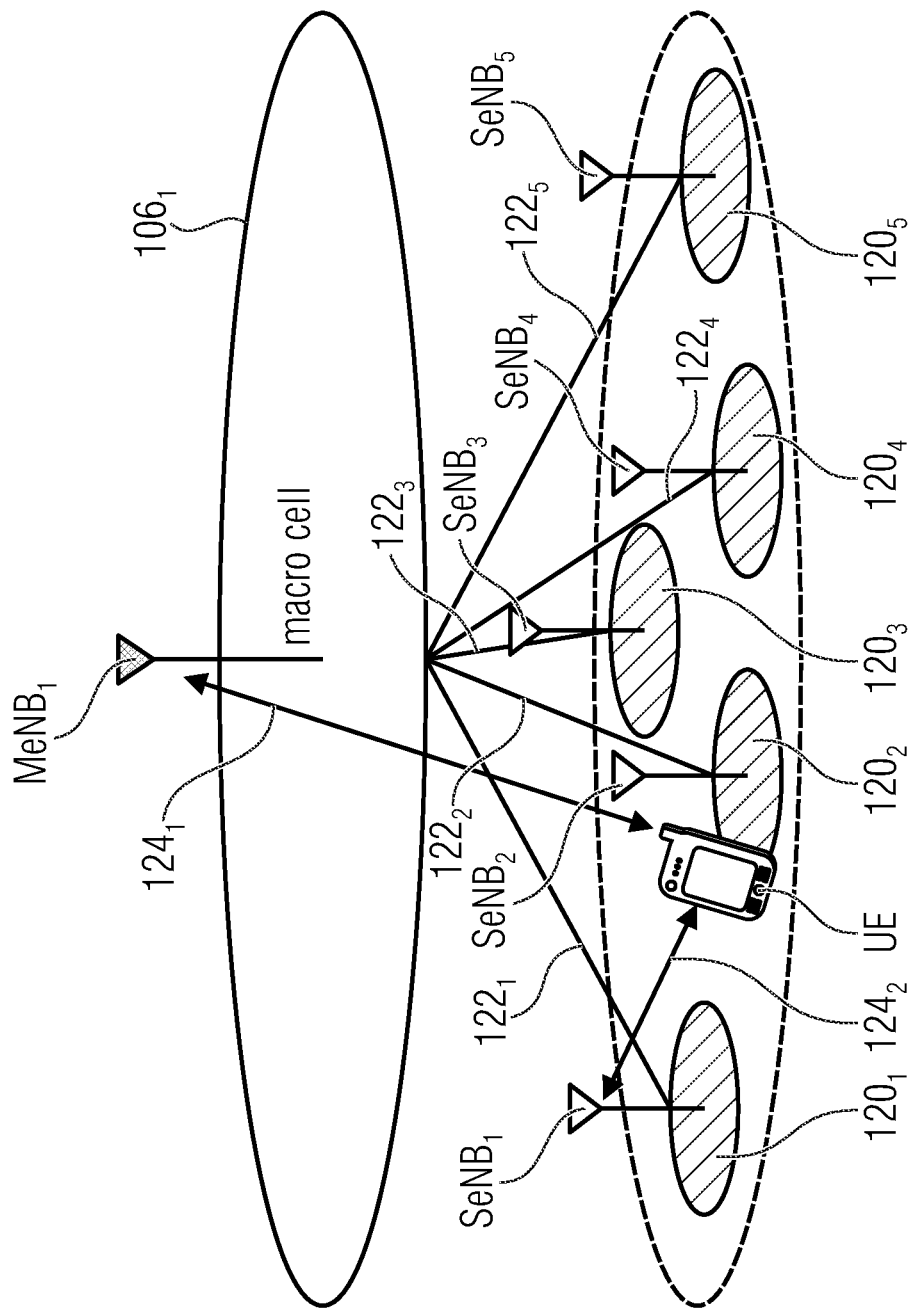
FIG. 2 is a schematic representation of a cell, like cell 106$_1$ in FIG. 1, having two distinct overlaid networks, the networks comprising a macro cell network including the macro cell 106$_1$, and a small cell network.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

As mentioned above, UEs of a wireless communication system may directly communicate with each other using the sidelink, which is also referred to as device-to-device (D2D) or sidelinks (SL) communication, or a vehicle-to-everything (V2X) communication, which includes vehicle to vehicle (V2V) communication. In the following, aspects of the inventive approach will be described mainly with reference to V2V communications, however, the inventive approach is not limited to such scenarios and is equally applicable to other communications using the sidelink, e.g., to D2D and to further V2X communications besides V2V.

Figure 5:
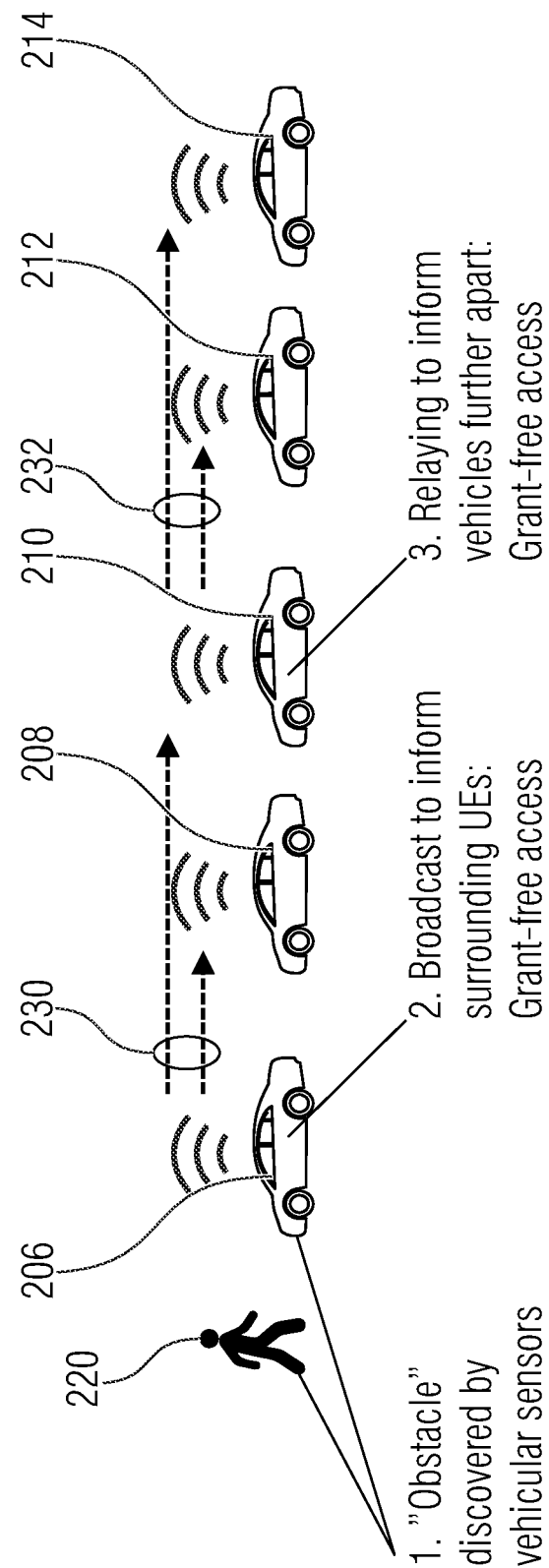
FIG. 5 shows a schematic view of an emergency scenario with collision avoidance, where an emergency braking message can be broadcasted to surrounding vehicles and consecutively relayed to vehicles further apart.

Referring to FIG. 5, it is exemplarily assumed, that the vehicles 206 to 214 are equipped with UEs. The UEs are configured to communicate with each other using a sidelink resource pool of the wireless communication network 100.

Figure 3:
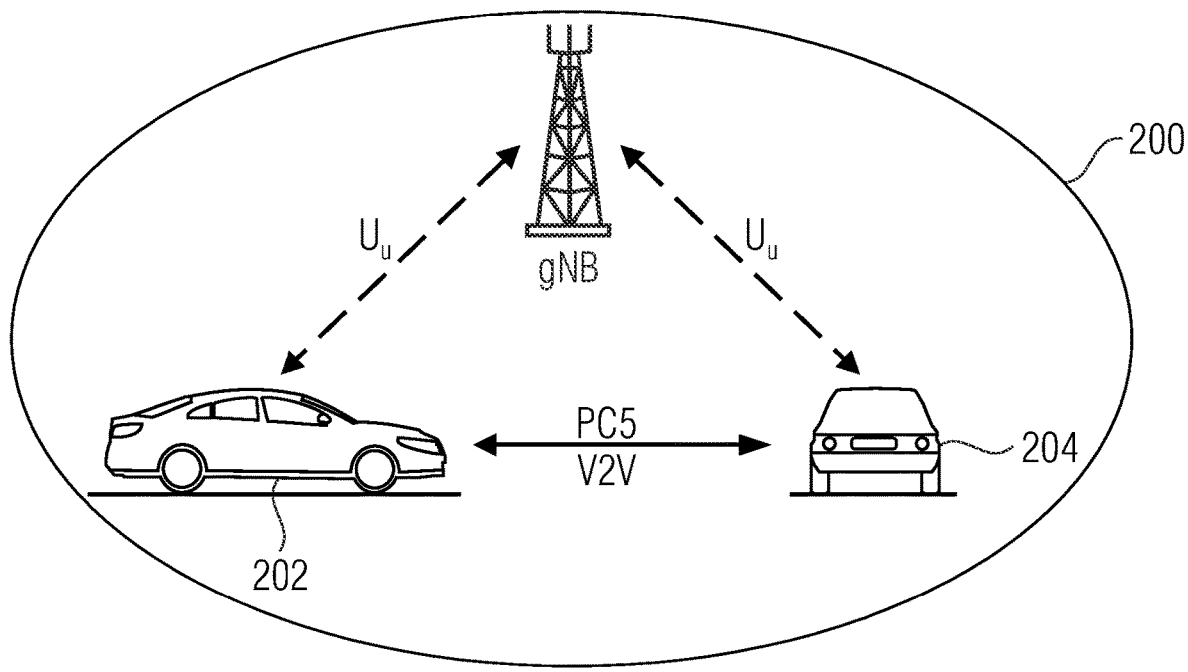
FIG. 3 shows a schematic representation of a situation in which UEs directly communicating with each other are in coverage of a base station.
Figure 4:
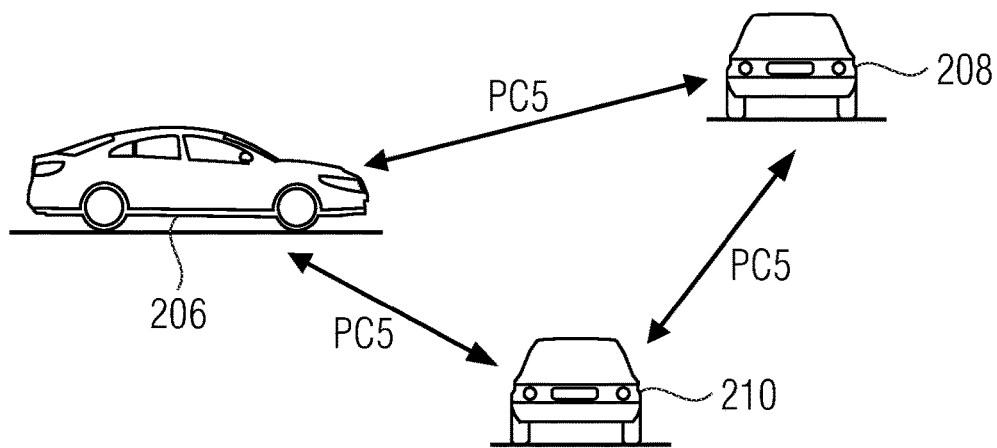
FIG. 4 shows a scenario in which UEs directly communicating with each other are not are not in coverage of a base station, i.e., are not connected to a base station.

For example, the UEs of the vehicles 206 to 214 can be configured to communicate with each other using V2X Mode 3 (see FIG. 3), in which the UEs are served by a transceiver (e.g., a base station, a macro cell base station, a small cell base station or a road side unit) of the wireless communication network 100, wherein the transceiver performs scheduling of resources for the sidelink communication of the UEs. Naturally, the UEs of the vehicles 206 to 214 also can be configured to communicate with each other using V2X Mode 4 (see FIG. 4), in which the UEs perform scheduling of resources for the sidelink communication autonomously.

In any case, the UE of the first vehicle 206 can be configured to transmit, responsive to an external time critical requirement (e.g., an external emergency situation (e.g., an obstacle 220 detected by sensors of the vehicle 206) or alternatively a latency critical communication), an emergency notification (EN) signal 230 on a resource of the wireless communication system.

Thereby, the UE of the first vehicle 206 can be configured to transmit the emergency notification (EN) on a guard resource of the wireless communication system, wherein the guard resource is a guard band between different resource pools of the wireless communication system, or wherein the guard resource is a guard time of a resource pool of the wireless communication system;

one or more reference symbols of the wireless communication system; or one or more resources of a defined resource pool of the wireless communication used for exceptional data transmission system (e.g. exceptional or critical or emergency pool).

Additionally, or alternatively, the UE of the first vehicle 206 can be configured to transmit the notification signal on the resource of the wireless communication system with one of the following transmit power options:

the transmit power is greater than a regular transmit power used by the transceiver for transmitting signals;

the transmit power is equal to the maximum regular allowed transmit power; or the transmit power is higher than a maximum regular transmit power, wherein the transceiver is configured to transmit the notification signal using one of the following, but not limited, options:

a defined power offset is added to the maximum regular transmit power; or a configurable power offset increases the maximum regular transmit power.

As already mentioned, the external time critical requirement can be an emergency situation or a latency critical communication Thereby, the emergency situation or the latency critical communication can be indicated by a PPPP value (PPPP=ProSe per packet priority) or PPPR value (PPPR=ProSe per packet reliability).

For example, based on the PPPP value (or any other priority flag or a combination of PPPP and any other priority handling scheme (e.g., ProSe per packet reliability (PPPR)) the emergency requirement can be triggered and proceed to the proposed mechanism.

In embodiments, the UE of the first vehicle 206 can be allowed to access the resource of the wireless communication system without being granted. For example, the UE of the first vehicle 206 can be configured to grant free access the resource of the wireless communication system. Thus, the UE of the first vehicle 206 can be configured to transmit the EN signal 230 on said resourced irrespective of whether said resource is free or occupied, e.g., by another UE.

For example, in the V2X Mode 3, the UE of the first vehicle 206 can be configured to transmit the EN signal 230 on a resource of the sidelink resource pool or on a guard resource between the sidelink resource pool and the cellular resource pool or on a guard time of the sidelink resource pool. Another option is to use one or multiple reference symbols of the sidelink resource pool.

For example, in the V2V Mode 4, the UE of the first vehicle 206 can be configured to transmit the EN signal 230 on a resource of the sidelink resource pool.

The UEs of the second and third vehicles 208 and 210 can be configured to detect a signal, that is transmitted with a transmit power that is transmitted with a transmit power that is equal to or higher than the maximum allowed transmit power or higher than a regular transmit power used on the resources of the wireless communication system, as notification signal;

or transmitted on a guard resource of the wireless communication system as notification signal, wherein the guard resource is a guard band between different resource pools of the wireless communication system, or wherein the guard resource is a guard time of a resource pool of the wireless communication system;

or transmitted on one or more reference symbols of the wireless communication system as notification signal;

or transmitted one or more resources of a defined resource pool of the wireless communication not used for regular data transmission system as notification signal.

Thereby, the UEs of the second and third vehicles 208 and 210 can be configured to switch into a time critical operation mode responsive to the detection of the notification signal.

In the emergency operation mode, the UEs can be configured to to mute ongoing transmissions, e.g., in the sidelink resource pool, re-transmit the EN signal on a resource of the wireless communication system, transmit an acknowledgement notification signal to the UE that transmitted the EN signal, and/or transmit a transmission mute notification signal configured to cause another user equipment to mute transmissions in the sidelink resource pool.

For example, referring to FIG. 5, the UEs of second and third vehicles 208 and 210 can mute ongoing transmissions, e.g., in the sidelink resource pool, wherein the UE of the third vehicle 210 may further re-transmit the EN signal 232 on another resource of the wireless communication system.

Thereby, the UE of the third vehicle 210 can be configured to retransmit the EN signal 232 on a guard resource of the wireless communication system, wherein the guard resource is a guard band between different resource pools of the wireless communication system, or wherein the guard resource is a guard time of a resource pool of the wireless communication system;

one or more reference symbols of the wireless communication system; or one or more resources of a defined resource pool of the wireless communication used for exceptional data transmission system (e.g. exceptional or critical or emergency pool).

Additionally, or alternatively, the UE of the third vehicle 210 can be configured to transmit the notification signal on the resource of the wireless communication system with one of the following transmit power options:

the transmit power is greater than a regular transmit power used by the transceiver for transmitting signals;

the transmit power is equal to the maximum regular allowed transmit power; or the transmit power is higher than a maximum regular transmit power, wherein the transceiver is configured to transmit the notification signal using one of the following, but not limited, options:

a defined power offset is added to the maximum regular transmit power; or a configurable power offset increases the maximum regular transmit power.

Thereby, the UE of the third vehicle 210 may grant-free access said resource to re-transmit the EN signal 230.

For example, said resource may be a resource of the sidelink resource pool (e.g., in V2X Mode 3 and V2X Mode 4) and/or a resource on a guard band between the sidelink and the cellular resource pool or on a guard time of the sidelink resource pool.

As indicated in FIG. 5 by way of example, the UEs of the fourth and fifth vehicles 212 and 214 can be configured to receive the (re-transmitted) EN signal 232 from the UE of the third vehicle 206 by detecting a signal, that is transmitted with a transmit power that is greater than a regular transmit power used on the resources of the wireless communication system, wherein the UEs can be configured to switch into an emergency operation mode responsive to the detection of the EN signal, as already described above with reference to the UEs of the second and third vehicles 212 and 214.

Subsequently, embodiments of the UEs, which can be configured to operate, for example, in the D2D Mode 1, D2D Mode 2, V2X Mode 3, and/or V2X Mode 4, are described in further detail.

1. Assumptions for Valid Sidelink Transmission

In embodiments, it is assumed that the initial steps, i.e. synchronization and radio parameter acquisition, were already successfully performed and the vehicles (equipped with UEs)
  camp on a cell and are synchronized to this cell, or
  are attached to a UE-relay-to-Network, and receiving the primary and secondary synchronization signal, i.e., PSS and SSS, respectively.

In embodiments, resource allocation can be defined for the following two transmission modes (scheduled (granted) and autonomous (shared) transmission modes):
(1) Scheduled/granted transmission mode (sidelink transmission mode "1" (D2D) or "3" (V2X)):
  a UE using a sidelink camps on the cell/BS (with or without Random Access (RA) procedure);
  hence the BS grants UE physical resources blocks (PRBs) (e.g., per zone, i.e., geospatial zone if defined); and
  a UE is allowed to use the resources as far as the UE camps on the cell or stays in the defined zone. The BS decides on the resource pool/zone, resource pool Starts-and-ends and grants resources to individual users.
(2) UE autonomous shared resource selection (sidelink transmission mode "2" (D2D) or "4" (V2X)):
  in this case, the BS may define a per zone limited resource pool within the UL transmission band (in time and frequency);
  these resource pool indices are transmitted to the UEs, i.e. the UE receives two indices per pool, Pool_Start and Pool_End; and
  UE accesses these resources using e.g., sensing or random selection.

In embodiments, on sidelink for V2X three coverage scenarios are supported:
  in coverage: UE camps on cell in active radio resource controller (RRC) state;
  partially in coverage: the sidelink UE is connected to a relay, which is active or at least camps on a BS/cell; and
  out of coverage: in case both, the UE and/or the relay are out of coverage.

In embodiments, the autonomous transmission mode covers also the out of coverage scenarios (currently referred to as PS (public safety) by 3GPP and wearable scenarios, which are going to be extended. However, partially covered scenarios, i.e., with a relay UE, may use both transmission modes, i.e., ¾ and ½.

In embodiments, all currently existing 4 transmission modes and possibly later on added transmission modes may be used.

2. Emergency Notification (EN)

Traffic scenarios, such as collision avoidance indicated in FIG. 5, need immediate reaction not only by the directly affected vehicles, but also by those in the proximity. As described above, an EN is broadcasted on the sidelink (e.g., using direct communication V2V/V2P) by the initially affected vehicle 206 to all vehicles 208 to 214/pedestrians in the proximity. The EN has to be transmitted with minimum delay (low latency) demanding a very high (ultra) reliability (URLLC).

In embodiments, the following assumptions are made:
(1) The transmission is based on a slot duration, say TTI, and every possible shorter duration, say sTTI.
(2) If multiple UEs would transmit the EN at the same frequency/time domain, it is expected, that these refer to the identical emergency situation. Different emergency cases detected in proximity at exactly the same time are hardly expected.
(3) Different emergency events are expected to use different TTI or sTTIs.

In embodiments, to ensure both low latency and high reliability, an EN for V2X is used, which is valid for direct D2D communication and may also partly apply for ENs in the uplink.
(1) To ensure the extreme low latency, a grant-free EN is used. This should overcome the typically needed significant delay in cellular networks prior to data transmission, caused by e.g. multi-hop (multiple nodes) and resource allocation (including scheduling).
(2) The EN is repeated multiple times to guarantee the needed reliability, i.e. the reception of all involved UEs to overcome initial collisions or UEs unable to receive the initial EN due to ongoing data transmission, while the initial EN is sent.
(3) To overcome the possibly too short distance to transmit the EN, relaying is proposed. Whenever the initial notifying UEs stops the repetition, other UEs (who successfully received the original EN) may repeat the signal, to notify also further remote UEs.

In embodiments, several aspects are used to achieve the low latency and the high reliability:
(1) Transmission of the emergency notification:
  signal characteristics—a unique signal with unique characteristics independent of the schedule is transmitted indicating an emergency;
  different frequency/time domains to transmit the EN are used; and
  re-transmission of the EN by the initiating vehicle.
(2) Reception of the EN by UEs in proximity:
  first, decode the EN cause and stop transmission in the consecutive D2D pools; and
  second, inform UEs (not receiving the EN) due to simultaneous transmission, while the EN was sent (e.g. due to HARQ), i.e., randomize the time-frequency resource of the EN to avoid repeated interference in subsequent TTIs.
(3) Relaying EN by notified UEs to inform further remote UEs.

Although embodiments are described herein mainly making reference to the sidelink on V2V/V2P/V2I, embodiments are also applicable to network-controlled transmission (V2N) emergency handling. Further, embodiments are applicable as well for industrial environment for direct D2D between machines/robots. Furthermore, embodiments are applicable on the uplink in the cellular infrastructure mode, thereby exceeding V2X/D2D on the sidelink.

2.1 EN Signal Characteristics

In embodiments, the EN can be a unique signal, which can be transmitted independent of the schedule with at least one out of the following three signal characteristics.

First, the EN signal can be transmitted with a (max.) allowed UE power. For example, the (transmit) power can be increased to maximum UE power or to a high-power level in relation to other D2D communication. Thereby, the (transmit) power is not restricted to D2D $p_{max}$, rather the EN can be sent with the max. allowed power ([17], TS36.101, table 6.2.4.G-2: A-MPR for NS_33), wherein (optionally) the Additional Maximum Power Reduction (A-MPR) reducing the max. allowed TX power can be ignored.

Second, the EN signal can comprise a pre-defined unique bit sequence (emergency flag/emergency pattern). Thus, the EN can be easily recognized and/or is easily decodable. For example, if the EN is not bitwise encoded, then a simple IQ-pattern (same as pilot signal) can be used. For example, if the EN is bitwise encoded, then a lowest MCS can be used. For example, a robust (e.g., the most robust) modulation scheme can be used for the EN to ensure the needed reliability/robustness for the transmission.

Third, the EN signal can be transmitted using a TTI or sTTI (if supported). Thereby, sTTI is seen as beneficial for the EN with low latency requirements as it supports a faster reception and processing time. However, the EN signal also can be transmitted using LTE TTIs.

2.2 EN Signal: Frequency and/or Time Domain

Figure 6:
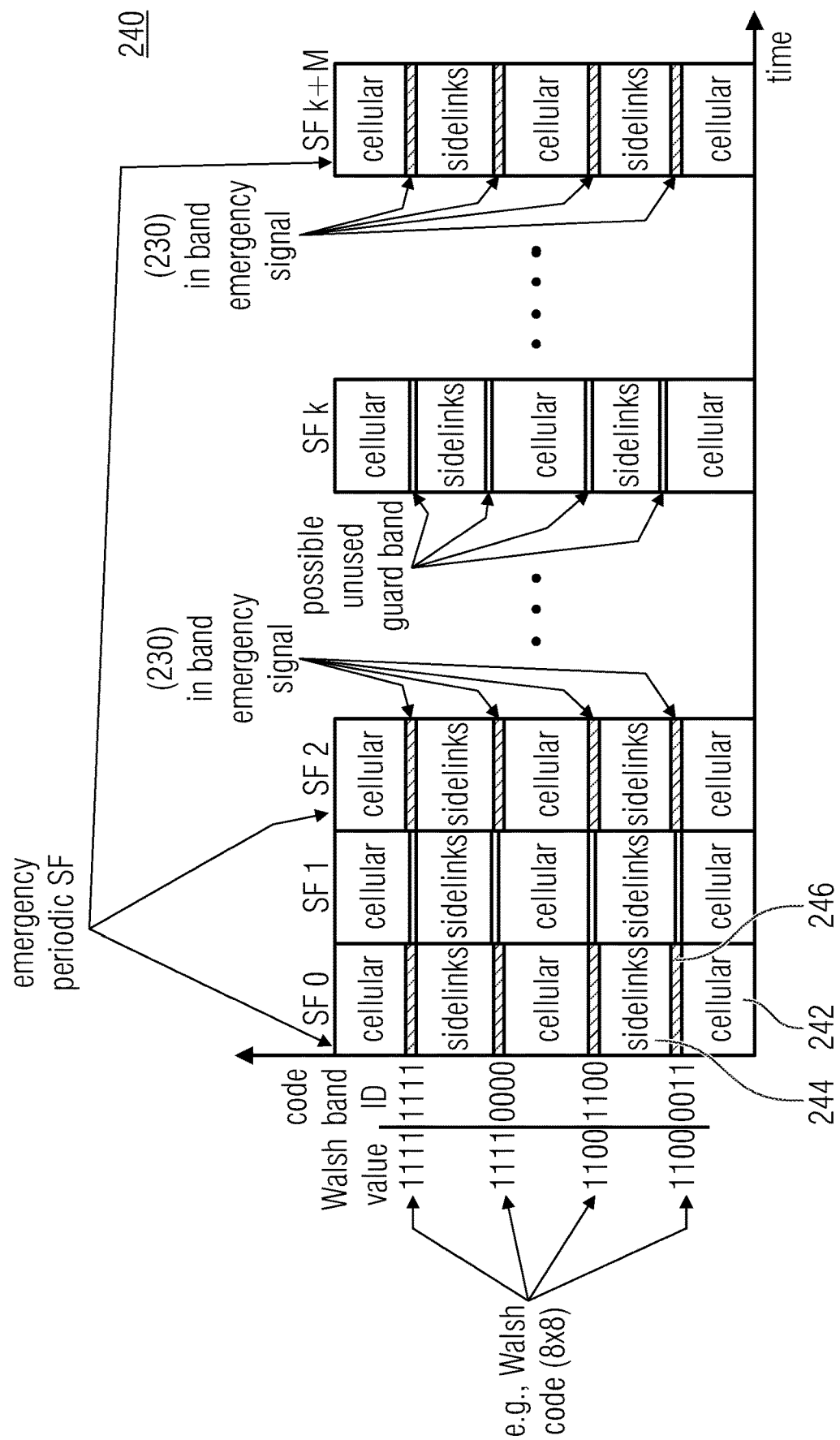
FIG. 6 shows in a diagram an exemplary allocation of resources of a resource pool of the wireless communication network.
Figure 7:
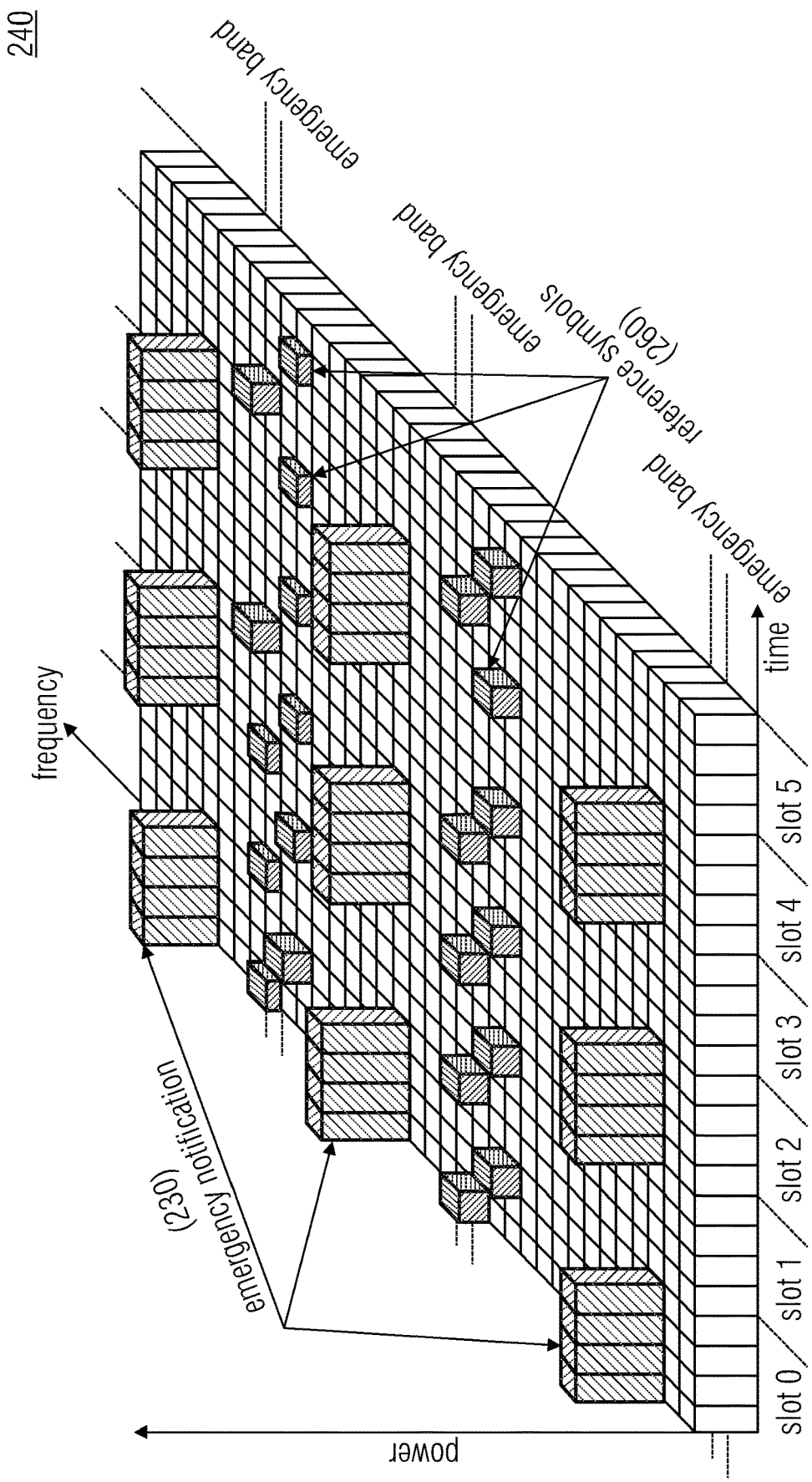
FIG. 7 shows in a three-dimensional diagram a transmit power in the different resources of the resource pool of the wireless communication network when an EN signal is transmitted with a transmit power that is greater than a regular transmit power used in the resources of the wireless communication network.

In embodiments, the EN signal (alarm signal) can be transmitted between the UL cellular resources and the sidelink resource pool(s), i.e., in the guard band (see FIG. 6), or the EN signal (alarm signal) can be transmitted in the sidelink resource pool (see FIG. 7).

In embodiments, the transmission of the EN signal can be impulsive in time, i.e., within the transmission of the slot/sub-frame/TTI/sTTI. The duration on the alarm in time can be 1-OFDM/SC-FDMA symbol, i.e., 1-symbol duration, e.g., see FIG. 8 and the below description.

2.2.1 In Band/Guard-Band EN Signal Transmission (FDM)

In embodiments, for the transmission of the EN signal within the subframe, the frequency guard band can be used, which serves to separate the V2X or D2D resource pools from "normal" uplink resources. This guard band is in measure of subcarriers or physical resource blocks (PRBs, i.e., 12 resource blocks). If the guard band is not used, an EN/alarm signal/tone can be inserted in/within/at the sidelink resource pool outer PRBs. Hence, one row of subcarriers or one or more PRB(s) can carry this EN.

In embodiments, the alarm message in this guard band/in-band can either be coded or uncoded. The alarm signal may have also higher transmission power to have better reachability/decodability.

FIG. 6 shows in a diagram an exemplary allocation of resources of a resource pool 240 of the wireless communication network. As shown in FIG. 6, the resource pool 240 of the wireless communication network can comprise cellular resource pools 242 and sidelink resource pools 244. Thereby, the EN signal 230 can be transmitted (or sent) in one (or more than one) of the guard periods 246 between the cellular (UL users) resource pools and sidelink resource pools. Thereby, FIG. 6 depicts the in-band possible gaps or utilized in band (around the sidelink resource pool) subcarriers or PRBs for EN transmission in some selected subframes/slots/TTI/sTTI.

FIG. 7 shows in a three-dimensional diagram a transmit power in the different resources of the resource pool 240 of the wireless communication network when an EN signal 230 is transmitted with a transmit power that is greater than a regular transmit power used in the resources of the wireless communication network, and (optionally) also greater than a transmit power used for transmitting reference signals 260.

In other words, FIG. 7 shows a frequency/time/power EN representation assuming in-band transmission with higher power values. The value of the power and/or the code structure of the transmitted data in frequency and time can be utilized to detect/correlate/decode the data.

Further, in FIG. 7, the emergency band can be (at least) one out of a guard band, an exceptional pool or an emergency pool.

2.2.2 Time-Domain Transmission of EN Signal (TDM)

In embodiments, the EN signal can be transmitted in the time domain considering two options.

According to a first option, the EN can be transmitted in the time domain within any OFDM symbol/part of the subframe or the whole sidelink subframe/V2X-pool without restriction to a specific symbol. For example, the EN symbol can be sent on the whole frequency band (taking into account interference on UL TX; can be used to inform the BS about the emergency situation). For example, the EN symbol can be filtered to restrict the EN TX on one or more sidelink pools or other transmission pools.

According to a second option, the EN can be transmitted in the last OFDM symbol. Thereby, at least a part of this last OFDM symbol, which is either empty (guard time) or used as switching symbol to turnaround between sidelink TX and RX ([4], section 9.2.5]), can be used for transmitting the EN signal. Detection of energy in unused time/frequency resource or with deterministic transmission pattern may ease the detection of the EN on sidelinks and reduces interference to already transmitted data.

Figure 8:
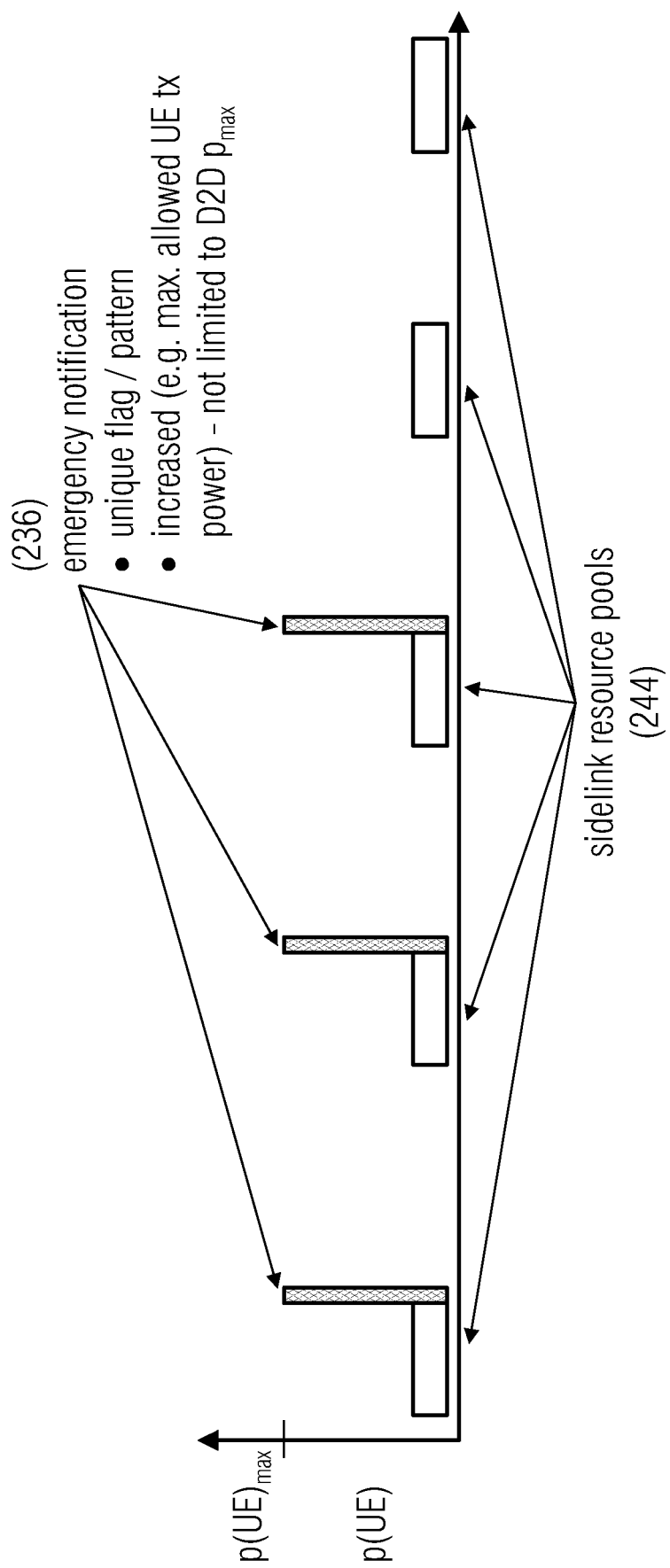
FIG. 8 shows in a diagram a transmit power in the sidelink resource pool of the wireless communication network when an EN signal is transmitted with a transmit power that is greater than a regular transmit power used in the sidelink resource pool.

FIG. 8 shows in a diagram a transmit power in the sidelink resource pool 244 of the wireless communication network when an EN signal 230 is transmitted with a transmit power that is greater than a regular transmit power used in the sidelink resource pool. In other words, FIG. 8 shows EN sent in time/frequency domain (e.g. in the last OFDM symbol of a subframe, which is currently not used (guard period)—within sidelink resource pool).

2.2.3 Transmission Options of the EN

In embodiments, independent on whether the EN signal is transmitted (or sent) in the guard band, in the sidelink resource pool, or in the time/frequency domain, the following two options may apply.

According to the first option (usually expected scenario with limited EN transmission), whenever the UE is noted of an emergency (independent of the transmission mode), the UE can perform a grant free access to the next possible (V2X/D2D/uplink) resource to transmit the EN. This behavior applies independent whether this resource is free or allocated to any other UE. Whether the resource was already allocated by the network or any other device to another V-UE/UE will be ignored. Possible degradation due to interference will be accepted. In this case, the EN might collide with data transmitted by any other UE to which these resources were allocated (transmission mode 1, 3) or any other UEs (transmission mode 2, 4). The caused interference mainly depends on the distance and the channel between repeated codes. No protection is provided as this spontaneous access is only allowed for the very limited number of EN signals.

According to the second option (massive EN transmission), more than one EN in one subslot on same or different frequencies is allowed.

In accordance with embodiments of the second option, to increase the number of multiple access UEs transmitting EN signals at the same time, the UE (1) can perform random hopping, i.e. transmit its EN signal on a random (pseudo random) time and frequency locations following a predefined random (pseudo random) sequence selected from a certain code book, and (2) use a random code, for example, selected from an orthogonal (or a quasi-orthogonal) code sets, and, for example, multiplying it by its EN signal.

In accordance with embodiments of the second option, the time-frequency resource of the EN signal can be randomized to avoid repeated interference in subsequent TTIs. Further, colliding UEs can be protected with orthogonal (or quasi-orthogonal) code sets.

For example, one or more emergency resource patterns can be allowed for hopping in frequency or time.

For example, users may select their hopping sequence based on their transmitted identifier (gold code/pseudo random code).

For example, different patterns may be orthogonal or quasi-orthogonal to each other allowing no collision or partial collision between each of them. Interference mainly depends on the distance and the channel between repeated codes.

For example, collision resolution might be monitored by the BS identifying the angle of arrival, time of arrival and Continuous BS sidelink frames sniffing is also needed.

In embodiments, the unique emergency flag (EN signal, e.g., coded EN signal) can be lower MCS like BPSK. While the rest are higher modulation schemes like 64 or 256 QAM. BPSK emergency symbols are using higher boosted power. So that they are also decoded more easily; i.e., with or without coding.

2.3 EN Signal Transmission Procedure (TX-Procedure)

2.3.1 First: Initial Transmission of the EN

According to a first embodiment (E1), in an initial transmission, the vehicle that faces an emergency situation may transmit an EN with a certain power (i.e. the max. allowed power ([17], table 6.2.4.G-2: A-MPR for NS_33); the A-MPR reducing the max. allowed TX power can be ignored) in certain time and/or frequency. The signal can be encoded or un-encoded message.

For example, for an encoded message, the EN/tone/signaling/alert message symbols can be encoded on (1) bit-level (with or without channel coded), or (2) in IQ signal level, i.e., signal complex-number pattern. This pattern can be detected via, e.g., correlation or other symbol matching techniques, e.g., one-to-one matching.

For example, for an un-encoded signal, the signal represents an energy which can be detected via different energy detection methods, e.g., Eigen value detection techniques.

In accordance with an optional implementation of the first embodiment (E1-S1), the EN can be encoded; the message can carry a signature code that is selected differently by each vehicle.

For example, if the encoding is done on the bit-level, the selection can be based on (1) randomly selecting pseudo random (PN) codes of certain length generated from an orthogonal orthonormal code set, e.g., using a limited PN sequence Walsh codes, or (2) randomly selecting pseudo random (PN) codes of certain length generated from an orthogonal/quasi-orthogonal/semi-orthogonal code set using a PN sequence generator like the binary Gold sequence (or Gold codes).

For example, if the encoding is done on the IQ (complex-valued) level a (1) a random or quasi random complex-valued code can be used, like the Zadoff-Chu (ZC) sequence, and/or (2) users may randomly generate cyclic shifts of an original sequence have orthogonal/quasi-orthogonal codes.

In accordance with an optional implementation of the first embodiment (E1-S2), the EN can be encoded; the message can carry a signature code that is selected differently by each vehicle.

For example, the EN can be transmitted in the time domain within any OFDM symbol/part of the subframe or the whole sidelink subframe/V2X-pool without restriction to a specific symbol. DMRS (reference) symbols are also regarded as valid option to transmit an EN. (Note: for V2X the number of DMRS symbols is expected to increase to e.g. 4 per subframe on the PC5 interface.) Thereby, the EN symbol can be (1) send on the whole frequency band (taking into account interference on UL TX; can be used to inform the BS about the emergency situation) or (2) filtered to restrict the EN TX on one or more sidelink pools or other transmission pools.

For example, the EN can be transmitted in the last OFDM symbol. Thereby, at least a part of this last OFDM symbol can be used, which is either empty (guard time) or used as switching symbol to turnaround between sidelink TX and RX ([4], section 9.2.5]). Detection of energy in unused time/frequency resource or with deterministic transmission pattern may ease the detection of the EN on sidelinks and reduces interference to already transmitted data.

2.3.2 Second: Re-Transmission of the EN

In accordance with an optional implementation of the first embodiment (E1-S3), the vehicle that initiated the original transmission shall (if needed) transmit one or more versions of the original EN. The re-transmitted message can have similar or different frequency positions. The retransmission can be performed one or more times until (1) a reaction is reached, or (2) a maximum number of retransmission is reached, or (3) the initial UE started to receive multiple (one or more) repetition from different UEs with similar or different pattern.

The repetition guarantees that the alert/alarm is received correctly despite possible bad channel conditions and/or collision with other resources/alarm messages.

In accordance with an optional implementation of the first embodiment (E1-S4), the repeated versions can be a similar version of the original transmission or different version with (1) different power value (if power/energy is used for detection), and/or (2) different code (binary or complex-valued) to avoid collision.

In accordance with an optional implementation of the first embodiment (E1-S5), the repetition can be done on every sub-frame/slot/TTI/sTTI (depending on the used numerology and terms) or on selected/mapped sub-frames (see FIG. 8).

For example, this mapped/selected pattern can be configured with the resource pool configuration/definition during association, on demand, or decided offline by the network.

For example, if the emergency alerts transmission patterns are not defined by the network, i.e., for old networks or out of coverage scenarios, the vehicle UE can select randomly sub-frames/slots and transmit the message in on the sideband PRBs of the resource pools.

2.4 EN Reception Procedure: General Behavior

According to a second embodiment (E2), any transmission within the alerted resource pool/alerted band can be stopped/muted/halted.

In accordance with an optional implementation of the second embodiment (E2-S1), on a successful reception of the EN by UEs in proximity (who are all set to be receiving and who are operating in this band or are intending to operate in this band), the UEs can stop/halt/forbidden any/all/every scheduled transmission in the next N consecutive subframe(s), unless an emergency transmission is mandated (this is done to avoid collision with the emergency data). Thereby, N can be a design issue which needs to be optimized, its value ranges from 1 to Maximum idle time.

In accordance with an optional implementation of the second embodiment (E2-S2), the muted/stopped/halted retransmission can be resumed once the receivers do not detect/decode an EN within a period T secs (quite-period). T can be a design issue and need to be adapted according to the use-case and the used technology.

2.4.1 EN Reception: Inform UEs Transmitting, while EN Sent (HARQ)

According to a third embodiment (E3), conflicting UEs can be informed during the EN sent utilizing a modified HARQ process feedback.

For example, it can be important to inform the UE who are transmitting during the EN transmission period. It also can be important to avoid continuous transmission/retransmission of the messages happened during—and then after—the emergency transmission period/sub-frame. Unless this conflicting transmission (coupled with the EN tone/alarm) is an emergency information, according to embodiments, the HARQ process acknowledgements signaling can be extended to consider/inform about any received emergencies within a negative-acknowledgement (NACK) or a positive acknowledgement (ACK), i.e., if the conflicting transmission was decoded correctly.

For transmitting UEs that happen to have transmission (or suspected transmission, i.e., indicated by the receiver UE) during the emergency transmission (i.e., during the EN sub-frame/sTTI/TTI), the following actions by the receiving UE, which is paired or receiving from the conflicting TX-UE, can be conducted:

In accordance with an optional implementation of the third embodiment (E3-S1), a modified HARQ NACK/ACK is needed to be transmitted by the receiving UE (e.g., on the physical sidelink control channel (PSCCH)) as follows: The receiving UE sends a NACK/ACK with extra information (more bits) indicating that the NACK/ACK is due to the EN.

In accordance with an optional implementation of the third embodiment (E3-S2), once the modified NACK/ACK signaling is received, the conflicting transmitting UE stops/halts/mute any further transmission in the next N consecutive sub-frames/TTI/sTTI. N is again a design factor that depends on the emergency handling. The outstanding messages are saved in a buffer until the next suitable transmission.

In accordance with an optional implementation of the third embodiment (E3-S3), the muted/stopped/halted retransmission shall be resumed once the receivers do not detect/decode an EN within a period T secs (quite-period). T is a design issue and need to be adapted according to the use-case and the used technology.

In accordance with an optional implementation of the third embodiment (E3-S4), the HARQ feedback can be extended: instead of a random back-off as in (E5-S3), the feedback can get wider steps, i.e., n+4→n+6, n+8, n+12, . . . , .

2.4.2 Relaying: To Inform UEs Further Apart, e.g. UEs Out of Coverage with Respect to Sidelink Communication in a Cell According to a fourth embodiment, the EN can be re-transmitted/relayed. Once a UE receives the EN signal, it stops/halts/forbids its upcoming transmission as described before and performs the following steps. First, it keeps its receiver tuned to detect (uncoded)/decode (coded) further EN signals. Second, if defined (e.g., if the detected/decoded emergency level is marked high), the UE retransmits/relays the EN on different recourses and using a different code/structure/pattern. Third, if not defined (e.g., if the detected/decoded emergency level is low), the UE waits after receiving the original signal/alarm for one or more extra EN; hence, it retransmits it on different recourses and using different code/structure/pattern.

In accordance with an optional implementation of the fourth embodiment (E4-S1), to avoid collision due to too many UEs working as relay, the received signal strength could be used to decide whether the EN should be repeated or not.

For example, only in case the RSS is below a defined RSS threshold, the EN is transmitted by this UE.

For example, an extra information may be added to the encoded EN to perform relaying randomly or according to a transmission pattern in time.

In accordance with an optional implementation of the fourth embodiment (E4-S2), the UE preforming relaying may reuse the same transmission code or use another transmission code picked up randomly to avoid/minimize the collision with other repeater and/or other EN creators.

In accordance with an optional implementation of the fourth embodiment (E4-S2), a frequency/time hopping sequence can be used. The UE preforming relaying may reuse the same time/frequency location of the signal or different location selected randomly, also to avoid possible interference as stated before. The time frequency hopping can be done in an organized manner, e.g., frequency/time hopping, to avoid/minimize the chance of collision.

In other words, the re-transmission of the emergency notification signal can be sent by the successful receiver to inform transmitters of the EN signal, which could not receive the original EN signal. The EN signal can be transmitted once or multiple times depending on operator settings and radio/environmental conditions.

Figure 9:
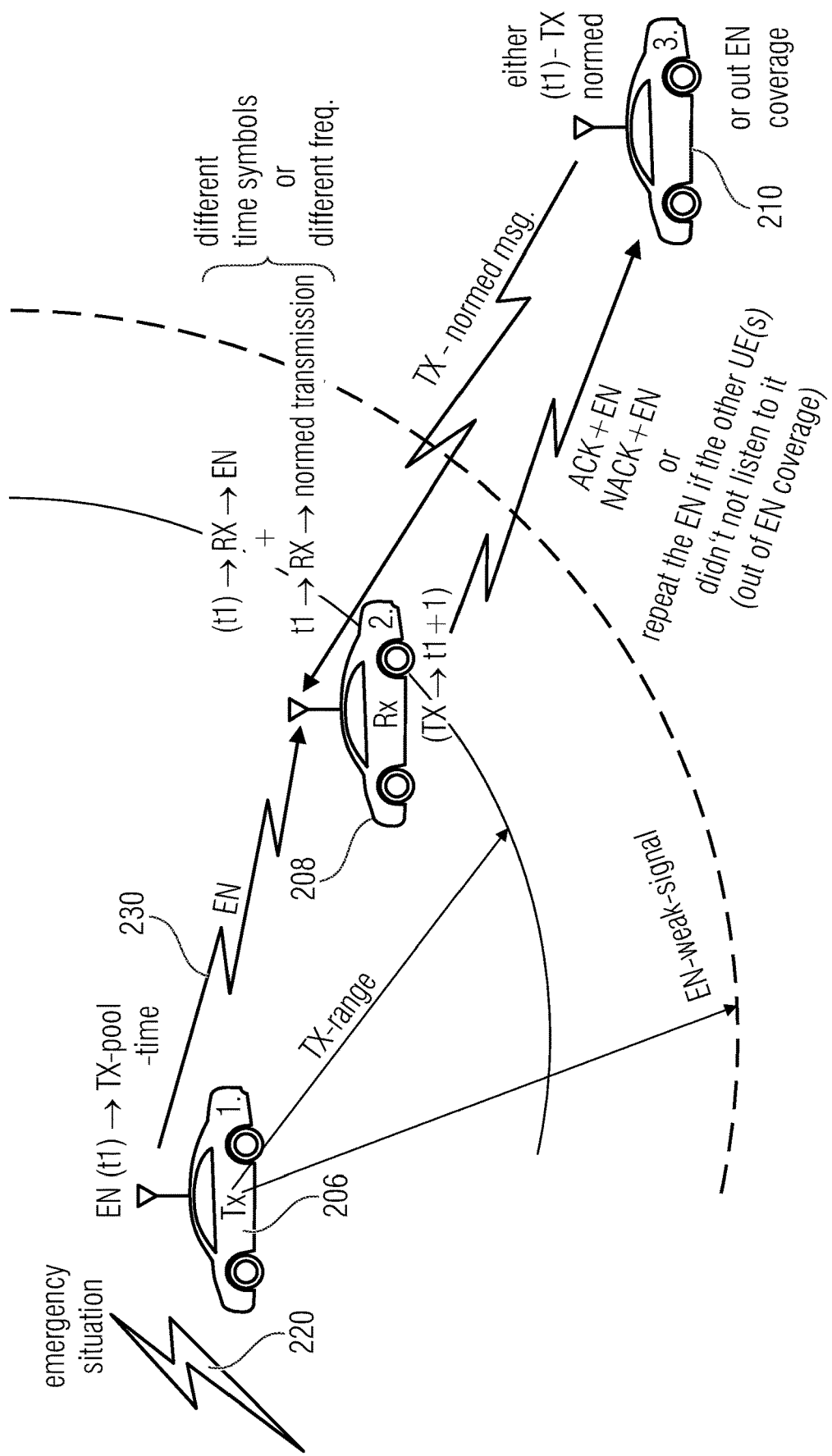
FIG. 9 shows a schematic view of an emergency scenario with collision avoidance, where an emergency braking message can be broadcasted to surrounding vehicles and consecutively relayed to vehicles further apart.

FIG. 9 shows a schematic view of an emergency scenario with collision avoidance, where an emergency braking message can be broadcasted to surrounding vehicles and consecutively relayed to vehicles further apart and/or out of coverage.

In detail, FIG. 9 shows three vehicles 206, 208 and 210 equipped with UEs and communicating with each other using a sidelink resource pool. The first vehicle 206 (UE1) may detect an emergency situation 220 and transmit responsive to the detection of the emergency situation 220 the initial EN signal 230.

The second vehicle 208 (UE2) is in coverage (TX range) of the first vehicle 206 (UE1) and successfully receives the EN signal from the first vehicle 206 (UE1).

However, the third vehicle 210 (UE3) is not able to receive the first EN signal 230 from the first vehicle 206 (UE1) because it was either (1) out of coverage of the EN message or (2) in transmission mode. Note, a UE may not be able to successfully receive an EN while it is transmitting data on V2X resource pool the EN is received. In case of (2), the second vehicle 208 (UE2) receives from the third vehicle 210 (UE3) the transmitted frame, wherein if the message was successfully received, then the second vehicle 208 (UE2) may respond with an ACK+EN (indicating successfully received data plus at the same time transmit the EN), wherein if the message was not successfully received, then the second vehicle 208 (UE2) may respond with an NAK+ EN (indicating a failure plus at the same time transmit the EN). In addition for case (1) and for case (2), the second vehicle 208 (UE2) may repeat the received EN (from UE1) one to multiple times.

2.5 Expanding V2V to Overall D2D and Uplink in Infrastructure Mode

Although aspects of the inventive approach were described mainly with reference to V2X, it is noted that the inventive approach is not limited to such scenarios. Rather, the inventive approach is also applicable to any critical communication, especially if low latency and/or high reliability are requested on any D2D communication and at least partly to uplink transmission on D2I. The described sidelink and dynamic-static scenarios covers all D2D and V2X use-cases.

3. Benefits and Technical Application Area

The inventive approach described herein provides spontaneous grant-free access for transmitting an EN signal, which allows immediate notification in case of an emergency, which is needed to ensure immediate reaction, e.g. to avoid personal damages and further collisions in traffic scenarios. The inventive approach allows bypassing the usual delay in cellular networks caused by scheduling to grant resources. Further, repetition of the emergency notification as well as the additional relaying functionality ensures the requested reliability to inform all possible involved vehicles and other road users.

The inventive approach can be applied, for example, in V2X applications requesting immediate reaction, which are described, e.g., in the use case group "advanced driving" [2] und by 5GAA (Automotive Association) by the use cases "Emergency Electronic Brake Lights" and "Real Time Situation Awareness".

In addition, the inventive approach also applies for industrial environment using D2D communication on the sidelink. Possible scenarios include emergency shutdowns for multiple machines/robots in industrial environment, e.g. in case persons might be harmed. Using spontaneous grant-free access the machine/robot in charge as well as machines/robots in proximity can be stopped. Additional immediate emergency activities may be started, e.g. emergency calls, fire alarm, water sprinklers.

4. Further Embodiments

FIG. 10 shows a flowchart of a method 300 for transmitting signals in a wireless communication system, according to an embodiment. The method 300 comprises a step 302 of transmitting, responsive to an external time critical requirement, a notification signal on a resource of the wireless communication system.

Thereby, according to sub-step 304 the notification signal can be transmitted on one of the following resources:

either a guard resource of the wireless communication system, wherein the guard resource is a guard band between different resource pools of the wireless communication system, or wherein the guard resource is a guard time of a resource pool of the wireless communication system;

or one or more reference symbols of the wireless communication system;

one or more resources of a defined resource pool of the wireless communication system used for exceptional data transmission (e.g. exceptional or critical or emergency pool).

Additionally, or alternatively, according to sub-step 306, the notification signal can be transmitted on the resource of the wireless communication system with one of the following transmit power options:

the transmit power is greater than a regular transmit power used by the transceiver for transmitting signals;

the transmit power is equal to the maximum regular allowed transmit power; or the transmit power is higher than a regular transmit power, wherein the notification signal is transmitted using one of the following, but not limited, options:

a defined power offset is added to the maximum regular transmit power; or a configurable power offset increases the maximum regular transmit power.

FIG. 11 shows a flowchart of a method 310 for receiving signals in a wireless communication system, according to an embodiment. The method 310 comprises a step 312 of detecting a signal, that is transmitted with a transmit power that is equal to or higher than the maximum allowed transmit power or higher than a regular transmit power used on the resources of the wireless communication system, as notification signal;

or transmitted on a guard resource of the wireless communication system as notification signal, wherein the guard resource is a guard band between different resource pools of the wireless communication system, or a guard time of a resource pool of the wireless communication system or transmitted on one or more reference symbols of the wireless communication system as notification signal;

or transmitted one or more resources of a defined resource pool of the wireless communication not used for regular data transmission system as notification signal.

Further, the method 310 comprises a step 314 of switching into a time critical operation mode responsive to the detection of the notification signal.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 350. The units or modules as well as the steps of the methods performed by these units may execute on one or more computer systems 350. The computer system 350 includes one or more processors 352, like a special purpose or a general purpose digital signal processor. The processor 352 is connected to a communication infrastructure 354, like a bus or a network. The computer system 350 includes a main memory 356, e.g., a random access memory (RAM), and a secondary memory 358, e.g., a hard disk drive and/or a removable storage drive. The secondary memory 358 may allow computer programs or other instructions to be loaded into the computer system 350. The computer system 350 may further include a communications interface 360 to allow software and data to be transferred between computer system 350 and external devices. The communication may be in the from electronic, electromagnetic, optical, or other signals capable of being handled by a communications interface. The communication may use a wire or a cable, fiber optics, a phone line, a cellular phone link, an RF link and other communications channels 362.

The terms "computer program medium" and "computer readable medium" are used to generally refer to tangible storage media such as removable storage units or a hard disk installed in a hard disk drive. These computer program products are means for providing software to the computer system 350. The computer programs, also referred to as computer control logic, are stored in main memory 356 and/or secondary memory 358. Computer programs may also be received via the communications interface 360. The computer program, when executed, enables the computer system 350 to implement the present invention. In particular, the computer program, when executed, enables processor 352 to implement the processes of the present invention, such as any of the methods described herein. Accordingly, such a computer program may represent a controller of the computer system 350. Where the disclosure is implemented using software, the software may be stored in a computer program product and loaded into computer system 350 using a removable storage drive, an interface, like communications interface 360.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alterative ways of implementing the methods and compositions of the present invention. It is therefore intended that the following appended claims be interpreted as including all such alterations, permutations and equivalents as fall within the true spirit and scope of the present invention.

LIST OF REFERENCES

[1] 3GPP TR 22.885 Technical Specification Group Services and System Aspects; Study on LTE support for Vehicle to Everything (V2X) services (Release 14), 2015-12.
[2] 3GPP TR 22.886 Technical Specification Group Services and System Aspects; Study on enhancement of 3GPP Support for 5G V2X Services (Release 15), 2017-03.
[3] P. Agyapong, H. Haas, A. Tyrrell and G. Auer, "Interference Tolerance Signaling Using TDD Busy Tone Concept," 2007 IEEE 65th Vehicular Technology Conference—VTC2007-Spring, Dublin, 2007, pp. 2850-2854.
[4] 3GPP TS 36.211 Evolved Universal Terrestrial Radio Access (E-UTRA); Physical Channels and Modulation, v 14.3.0
[5] 3GPP TS 36.212 Evolved Universal Terrestrial Radio Access (E-UTRA); Multiplexing and channel coding, v 14.3.0
[6] 3GPP TS 36.213 Evolved Universal Terrestrial Radio Access (E-UTRA); Physical layer procedures, v 14.3.0
[7] RP-170295 SI: Further Enhancements LTE Device to Device, UE to Network Relays for IoT and Wearables
[8] U.S. Pat. No. 9,357,402 B2 (Patent) Guard band usage for wireless data transmission
[9] 3GPP TS 36.331 Evolved Universal Terrestrial Radio Access (E-UTRA); Radio Resource Control (RRC); Protocol specification, v 14.3.0.
[10] Fa-Long Luo (Editor), Charlie (Jianzhong) Zhang (Editor): Signal Processing for 5G: Algorithms and Implementations, ISBN: 978-1-119-11646-2, October 2016, Wiley-IEEE Press
[11] Abbas E Gamal (Autor), Young-Han Kim (Autor), Network Information Theory, Cambridge, Cambridge University Press (8 Dec. 2011)
[12] 3GPP TR 36.881 Study on latency reduction techniques for LTE, Technical report (TR), Rel 15, v 14.0.0.
[13] RP-170847 New WID on New Radio Access Technology, Rel 15
[14] SungHoon Junga, Junsu Kimb, "A new way of extending network coverage: Relay-assisted D2D communications in 3GPP"; 2016.
[15] 3GPP TS 36.321 Evolved Universal Terrestrial Radio Access (E-UTRA); Medium Access Control (MAC) protocol specification, v 14.5.0.
[16] RP-161894 LTE-based V2X Services, LTE-based V2X Services
[17] 3GPP TS 36.101 Technical Specification Group Radio Access Network; Evolved Universal Terrestrial Radio Access (E-UTRA); User Equipment (UE) radio transmission and reception, V14.4.0 (2017-06).

LIST OF ABBREVIATIONS

A-MPR Additional Maximum Power Reduction
BS Base Station
CoCA Cooperative Collision Avoidance
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SET Sidelink Emergency Tone
sTTI Short Transmission Time Interval
TDM Time Division Multiplexing
TDMA Time Division Multiple Access
UE User Equipment (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N
ZC Zadoff-Chu

The invention claimed is:

1. A transceiver for a wireless communication system, wherein the transceiver is configured to communicate with at least one other transceiver of the wireless communication system using a resource pool of the wireless communication system;
   wherein the transceiver is configured to transmit, responsive to an external time critical requirement, a notification signal on a resource of the wireless communication system;
   wherein the transceiver is configured to transmit the notification signal on the resource of the wireless communication system with the following transmit power option:
   the transmit power is higher than the maximum allowed transmit power, wherein the transceiver is configured to transmit the notification signal using one of the following options:
      a defined power offset is added to the maximum allowed transmit power; or
      a configurable power offset increases the maximum allowed transmit power;
   wherein the maximum allowed transmit power is the configured one by a maximum power reduction, MPR, and an additional maximum power reduction, A-MPR.

2. The transceiver according to claim 1, wherein the external time critical requirement is an emergency situation or a latency critical communication.

3. The transceiver according to claim 1, wherein the external time critical requirement is indicated by a ProSe per packet priority, PPPP, or a ProSe per packet reliability, PPPR, value or a combination thereof.

4. The transceiver according to claim 1, wherein the one or more reference symbols are not used for data transmission, but for synchronization purposes.

5. The transceiver according to claim 1, wherein the configurable power offset depends on operator and/or environmental settings and/or conditions.

6. The transceiver according to claim 1, wherein the transceiver is allowed to access the resource of the wireless communication system without being granted.

7. The transceiver according to claim 1, wherein the guard time of the resource pool on which the transceiver is configured to transmit the notification signal is a last symbol of at least one out of
   a subframe, for example, for the sidelink allocated subframe the last fourteenth symbol;
   a slot;
   a transmission time interval; and
   a shortened transmission time interval;
   or wherein the guard band on which the transceiver is configured to transmit the notification signal is a guard band between a cellular resource pool and a sidelink resource pool of the wireless communication system.

8. The transceiver according to claim 1, wherein the guard time of the resource pool on which the transceiver transmits the notification signal is a configurable number of last symbols of at least one out of
   a subframe, for example, for the sidelink allocated subframe the last fourteenth symbol;
   a slot;
   a transmission time interval; and
   a shortened transmission time interval;
   or wherein the guard band on which the transceiver transmits the notification signal is a guard band between a cellular resource pool and a sidelink resource pool of the wireless communication system.

9. The transceiver according to claim 1, wherein the transceiver is configured to transmit the notification signal with a power up to the maximum possible transmit power allowed according to a mobile communication standard according to which the transceiver is configured to operate.

10. The transceiver according to claim 1, wherein the transceiver is served by a central transceiver, for example, a base station, of the wireless communication system, wherein the transceiver is configured to operate in a first mode of operation, in which scheduling of resources for the communication with the at least one other transceiver is performed by the central transceiver;
   the resource on which the transceiver is configured to transmit the notification signal is a resource of the sidelink resource pool;
   a guard band between the sidelink resource pool and the cellular resource pool;
   a guard time of the sidelink resource pool; or
   a reference symbol of the sidelink resource pool.

11. The transceiver according to claim 1, wherein the transceiver is configured to operate in a second mode of operation, for example the D2D Mode 2 or V2X Mode 4, wherein the transceiver is configured to schedule resources for the sidelink communication autonomously;
   wherein the resource on which the transceiver is configured to transmit the notification signal is
   a resource of the sidelink resource pool;
   a guard band between the sidelink resource pool and the cellular resource pool;
   a guard time of the sidelink resource pool; or
   a reference symbol of the sidelink resource pool.

12. The transceiver according to claim 1, wherein the transceiver is configured to re-transmit the notification signal at least once on another resource of the wireless communication system;

wherein the other resource of the wireless communication system is one of the following resources:
a guard resource of the wireless communication system, wherein the guard resource is a guard band between different resource pools of the wireless communication system, or wherein the guard resource is a guard time of a resource pool of the wireless communication system; or
one or more reference symbols of the wireless communication system;
and/or wherein the transceiver is configured to re-transmit the notification signal with one of the following transmit power options:
the transmit power is higher than the maximum allowed transmit power, wherein the transceiver is configured to transmit the notification signal using one of the following options:
a defined power offset is added to the maximum allowed transmit power; or
a configurable power offset increases the maximum allowed transmit power.

13. The transceiver according to claim 12, wherein the transceiver is configured to re-transmit the notification signal when one of the following conditions apply:
another transceiver of the wireless communication system in proximity is out of coverage of the notification signal transmitted by the transmitter; or
the transceiver receives from another transmitter of the wireless communication system in proximity data, while transmitting the notification signal, wherein in this case the transceiver is configured to transmit an ACK/NAK for the received data in combination with the notification signal during the next transmission.

14. The transceiver according to claim 13, wherein the transceiver is configured to select the resource on which the notification signal is transmitted and the other resource on which the notification signal is re-transmitted using a random or pseudo-random hopping pattern.

15. The transceiver according to claim 1, wherein the transceiver is configured to encode the notification signal, wherein the notification signal comprises a signature code that is selected differently by each transceiver of the wireless communication system;
wherein the transceiver is configured to encode the notification signal on a bit-level, wherein the transceiver is configured to select the signature code using one of the following options:
randomly selecting pseudo random codes of certain length generated from an orthogonal/orthonormal code set; or
randomly selecting a pseudo random codes of certain length generated from an orthogonal/quasi-orthogonal/semi-orthogonal code set using a pseudo random sequence generator;
or wherein the transceiver is configured to encode the notification signal on a IQ (complex-valued) level, wherein the transceiver is configured to select the signature code using one of the following options:
a random or quasi random complex-valued code; or
randomly generating cyclic shifts of an original sequence comprising orthogonal/quasi-orthogonal codes.

16. The transceiver according to claim 1, wherein the notification signal is configured to cause at least one other transceiver of the wireless communication system to mute transmissions.

17. The transceiver according to claim 1, wherein the transceiver is configured to generate the notification signal using a random or pseudo random code.

18. A transceiver for a wireless communication system, wherein the transceiver is configured to communicate with at least one other transceiver of the wireless communication system using a resource pool of the wireless communication system;
wherein the transceiver is configured to detect a signal, that is transmitted with a transmit power that is higher than the maximum allowed transmit power, as notification signal;
wherein the transceiver is configured to switch into a time critical operation mode responsive to the detection of the notification signal;
wherein the maximum allowed transmit power is the configured one by a maximum power reduction, MPR, and an additional maximum power reduction, A-MPR.

19. The transceiver according to claim 18, wherein the transceiver is configured, in the emergency operation mode, to mute an ongoing transmission.

20. The transceiver according to claim 18, wherein the transceiver is configured, in the time critical operation mode, to re-transmit the notification signal on a resource of the wireless communication system, wherein the resource of the wireless communication system is one of the following resources:
either a guard resource of the wireless communication system, wherein the guard resource is a guard band between different resource pools of the wireless communication system, or wherein the guard resource is a guard time of a resource pool of the wireless communication system;
or one or more reference symbols of the wireless communication system;
or wherein the transceiver is configured to transmit the notification signal on the resource of the wireless communication system with one of the following transmit power options:
the transmit power is higher than the maximum allowed transmit power, wherein the transceiver is configured to transmit the notification signal using one of the following options:
a defined power offset is added to the maximum allowed transmit power; or
a configurable power offset increases the maximum allowed transmit power.

21. The transceiver according to claim 20, wherein the transceiver is configured to re-transmit the notification signal when one of the following conditions apply:
another transceiver of the wireless communication system in proximity is out of coverage of the detected notification signal; or
the transceiver receives from another transmitter of the wireless communication system in proximity data, while the notification signal is transmitted, wherein in this case the transceiver is configured to transmit an ACK/NAK for the received data in combination with the notification signal during the next transmission.

22. The transceiver according to claim 18, wherein the transceiver is configured, in the time critical operation mode, to transmit a transmission mute notification signal configured to cause another transceiver to mute transmissions in the sidelink resource pool.

23. A wireless communication system, comprising:
a first transceiver; and
a second transceiver;
wherein the first transceiver is configured to communicate with at least one other transceiver of the wireless communication system using a resource pool of the wireless communication system;

wherein the first transceiver is configured to transmit, responsive to an external time critical requirement, a notification signal on a resource of the wireless communication system;

wherein the first transceiver is configured to transmit the notification signal on the resource of the wireless communication system with the following transmit power option:

the transmit power is higher than the maximum allowed transmit power, wherein the first transceiver is configured to transmit the notification signal using one of the following options:
- a defined power offset is added to the maximum allowed transmit power; or
- a configurable power offset increases the maximum allowed transmit power, wherein the maximum allowed transmit power is the configured one by a maximum power reduction, MPR, and an additional maximum power reduction, A-MPR;

wherein the second transceiver is configured to communicate with at least one other transceiver of the wireless communication system using a resource pool of the wireless communication system;

wherein the second transceiver is configured to detect a signal, that is transmitted with a transmit power that is higher than the maximum allowed transmit power, as notification signal;

wherein the second transceiver is configured to switch into a time critical operation mode responsive to the detection of the notification signal.

24. The wireless communication system according to claim 23, wherein the transceivers comprise D2D Mode 1 user equipments, D2D Mode 2 user equipments, V2X Mode 3 user equipment's, or V2X Mode 4 user equipments;

or wherein the transceivers comprise IoT devices.

25. The wireless communication system according to claim 23, further comprising:
a base station, a macro cell base station, a small cell base station or a road side unit.

26. A method for transmitting signals in a wireless communication system, the method comprising:
transmitting, responsive to an external time critical requirement, a notification signal on a resource of the wireless communication system;

wherein the notification signal is transmitted on the resource of the wireless communication system with the following transmit power option:

the transmit power is higher than the maximum allowed transmit power, wherein the notification signal is transmitted using one of the following options:
- a defined power offset is added to the maximum allowed transmit power; or
- a configurable power offset increases the maximum allowed transmit power;

wherein the maximum allowed transmit power is the configured one by a maximum power reduction, MPR, and an additional maximum power reduction, A-MPR.

27. A method for receiving signals in a wireless communication system, the method comprising:
detecting a signal, that is transmitted with a transmit power that is higher than the maximum allowed transmit power, as notification signal;

switching into a time critical operation mode responsive to the detection of the notification signal;

wherein the maximum allowed transmit power is the configured one by a maximum power reduction, MPR, and an additional maximum power reduction, A-MPR.

28. A non-transitory digital storage medium having a computer program stored thereon to perform the method for transmitting signals in a wireless communication system, the method comprising:
transmitting, responsive to an external time critical requirement, a notification signal on a resource of the wireless communication system;

wherein the notification signal is transmitted on the resource of the wireless communication system with one of the following transmit power options:

the transmit power is higher than the maximum allowed transmit power, wherein the notification signal is transmitted using one of the following options:
- a defined power offset is added to the maximum allowed transmit power; or
- a configurable power offset increases the maximum allowed transmit power, wherein the maximum allowed transmit power is the configured one by a maximum power reduction, MPR, and an additional maximum power reduction, A-MPR;

when said computer program is run by a computer.

29. A non-transitory digital storage medium having a computer program stored thereon to perform the method for receiving signals in a wireless communication system, the method comprising:
detecting a signal, that is transmitted with a transmit power that is higher than the maximum allowed transmit power, as notification signal;

switching into a time critical operation mode responsive to the detection of the notification signal, wherein the maximum allowed transmit power is the configured one by a maximum power reduction, MPR, and an additional maximum power reduction, A-MPR, when said computer program is run by a computer.

* * * * *